United States Patent
Inoue et al.

(10) Patent No.: US 9,738,288 B2
(45) Date of Patent: Aug. 22, 2017

(54) ACCELERATION/DECELERATION ERRONEOUS OPERATION DETERMINATION DEVICE, ERRONEOUS OPERATION ACCELERATION SUPPRESSION CONTROL DEVICE, AND ACCELERATION/DECELERATION ERRONEOUS OPERATION DETERMINATION METHOD

(71) Applicant: NISSAN MOTOR CO., LTD., Yokohama-shi, Kanagawa (JP)

(72) Inventors: Takuya Inoue, Kawasaki (JP); Takeshi Sugano, Yokohama (JP); Toshimichi Gokan, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 40 days.

(21) Appl. No.: 14/441,568

(22) PCT Filed: Oct. 28, 2013

(86) PCT No.: PCT/JP2013/006364
§ 371 (c)(1),
(2) Date: May 8, 2015

(87) PCT Pub. No.: WO2014/083764
PCT Pub. Date: Jun. 5, 2014

(65) Prior Publication Data
US 2015/0274179 A1    Oct. 1, 2015

(30) Foreign Application Priority Data

Nov. 27, 2012   (JP) .................................. 2012-259186

(51) Int. Cl.
*B60W 50/12*   (2012.01)
*B60W 40/08*   (2012.01)
(Continued)

(52) U.S. Cl.
CPC ............... *B60W 50/12* (2013.01); *B60T 7/12* (2013.01); *B60T 7/22* (2013.01); *B60T 8/885* (2013.01);
(Continued)

(58) Field of Classification Search
None
See application file for complete search history.

(56) References Cited

U.S. PATENT DOCUMENTS

| | | | |
|---|---|---|---|
| 2010/0006358 A1* | 1/2010 | Ishikawa ................ | B60K 6/445 180/65.265 |
| 2010/0299037 A1* | 11/2010 | Sakaguchi ........... | B60K 26/021 701/70 |
| 2012/0179304 A1 | 7/2012 | Tokumochi | |

FOREIGN PATENT DOCUMENTS

| | | |
|---|---|---|
| JP | 01-161825 U | 11/1989 |
| JP | 2009057893 A | 3/2009 |

(Continued)

*Primary Examiner* — Mussa A Shaawat
*Assistant Examiner* — Kyung Kim
(74) *Attorney, Agent, or Firm* — Young Basile Hanlon & MacFarlane, P.C.

(57) ABSTRACT

An acceleration/deceleration erroneous operation determination device improves determination accuracy on whether or not a driver is erroneously performing an accelerator operation instead of a brake operation. A pedal opening degree by a driver and a continuation time for which the pedal opening degree is greater than an opening degree threshold value are detected. When the continuation time exceeds a time threshold value, it is determined that the driver is erroneously performing an accelerator operation instead of a brake operation. A vehicle speed of a vehicle, a rising gradient of a road surface, and an accelerator operation time operated by the driver are detected. The opening degree threshold value is made variable in accordance with the vehicle speed, the rising gradient, and the operation time.

(Continued)

The time threshold value is made variable in accordance with the vehicle speed, the rising gradient, and the operation time.

16 Claims, 18 Drawing Sheets

(51) Int. Cl.
*B60T 7/12* (2006.01)
*B60W 40/076* (2012.01)
*B60W 50/08* (2012.01)
*B60W 50/10* (2012.01)
*B60T 7/22* (2006.01)
*B60T 8/88* (2006.01)

(52) U.S. Cl.
CPC .......... *B60W 40/076* (2013.01); *B60W 40/08* (2013.01); *B60W 50/087* (2013.01); *B60W 50/10* (2013.01); *B60T 2201/022* (2013.01); *B60T 2270/413* (2013.01); *B60W 2520/10* (2013.01); *B60W 2540/10* (2013.01); *B60W 2540/12* (2013.01); *B60W 2550/142* (2013.01)

(56) References Cited

FOREIGN PATENT DOCUMENTS

| JP | 2012144053 A | 8/2012 |
| JP | 2012179936 A | 9/2012 |

\* cited by examiner

FIG. 9

TARGET THROTTLE OPENING DEGREE SPO* [%]

| | | OBSTACLE CERTAINTY LEVEL | | |
|---|---|---|---|---|
| | | NO DETECTION | LOW | HIGH |
| PARKING FRAME CERTAINTY LEVEL | NO DETECTION | NO SUPPRESSION | 25 | 0 |
| | LOW | 25 | 25 | 0 |
| | HIGH | 25 | 0 | 0 |

FIG. 10

| | | TARGET DECELERATION Ax* [G] |
|---|---|---|
| OBSTACLE CERTAINTY LEVEL | NO DETECTION | NO BRAKING |
| | LOW | 0.25 |
| | HIGH | 0.5 |

ACCELERATION/DECELERATION ERRONEOUS OPERATION DETERMINATION DEVICE, ERRONEOUS OPERATION ACCELERATION SUPPRESSION CONTROL DEVICE, AND ACCELERATION/DECELERATION ERRONEOUS OPERATION DETERMINATION METHOD

CROSS REFERENCE TO RELATED APPLICATION

The present application claims priority to Japanese Patent Application No. 2012-259186, filed Nov. 27, 2012, incorporated herein in its entirety.

TECHNICAL FIELD

The present invention relates to an erroneous operation acceleration/deceleration determination device, an erroneous operation acceleration suppression control device, and an erroneous operation acceleration/deceleration determination method.

BACKGROUND

In one technology described in JP Utility Model Publication Number H1-161825, a depression force applied to an accelerator pedal is detected and, when the depression force average value becomes a predetermined value or greater within a given period, an erroneous operation is determined, thereby closing a throttle valve of an engine to activate the brake.

While an erroneous operation to depress an accelerator pedal instead of a brake pedal may occur, for example, in a parking area or the like, the accelerator operation in this event tends to constantly change depending on a situation on the spot including various elements and thus is not unitary. Therefore, when a determination as to whether or not the operation is a erroneous operation is made solely based on an average value of pedal depression forces as in the conventional technique described in the JP Utility Model Publication Number H1-161825, there is a possibility that an accurate determination cannot be made.

SUMMARY

It is an object of the present invention to improve the accuracy of determination as to whether or not a driver is erroneously performing an accelerator operation instead of a brake operation.

An acceleration/deceleration erroneous operation determination device according to one aspect of the present invention detects a continuation time for which an accelerator operation amount by a driver is greater than an operation amount threshold value and, when the continuation time exceeds a time threshold value, the device determines that the driver is erroneously performing an accelerator operation instead of a brake operation. The device detects a vehicle speed of an own vehicle, a gradient of a road surface, and an accelerator operation time by the driver and makes variable at least one of the operation amount threshold value and the time threshold value in accordance with the vehicle speed, the gradient, and the accelerator operation time.

According to the present invention, since at least one of an operation amount threshold value and a time threshold value is made variable in accordance with a vehicle speed, a road surface gradient, and an accelerator operation time, it is possible to set appropriate threshold values suitable for a situation on the spot. Therefore, using these operation amount threshold value and time threshold value, it is possible to improve the accuracy of determination as to whether or not a driver is erroneously performing an accelerator operation instead of a brake operation.

BRIEF DESCRIPTION OF THE DRAWINGS

FIG. 9 is a table for use in setting a target throttle opening degree SPO*;

FIG. 10 is a table for use in setting a target deceleration Ax*;

DETAILED DESCRIPTION OF THE EMBODIMENTS

Embodiments of the present invention will now be described with reference to the drawings.

First Embodiment (Configuration)

Figure 1:
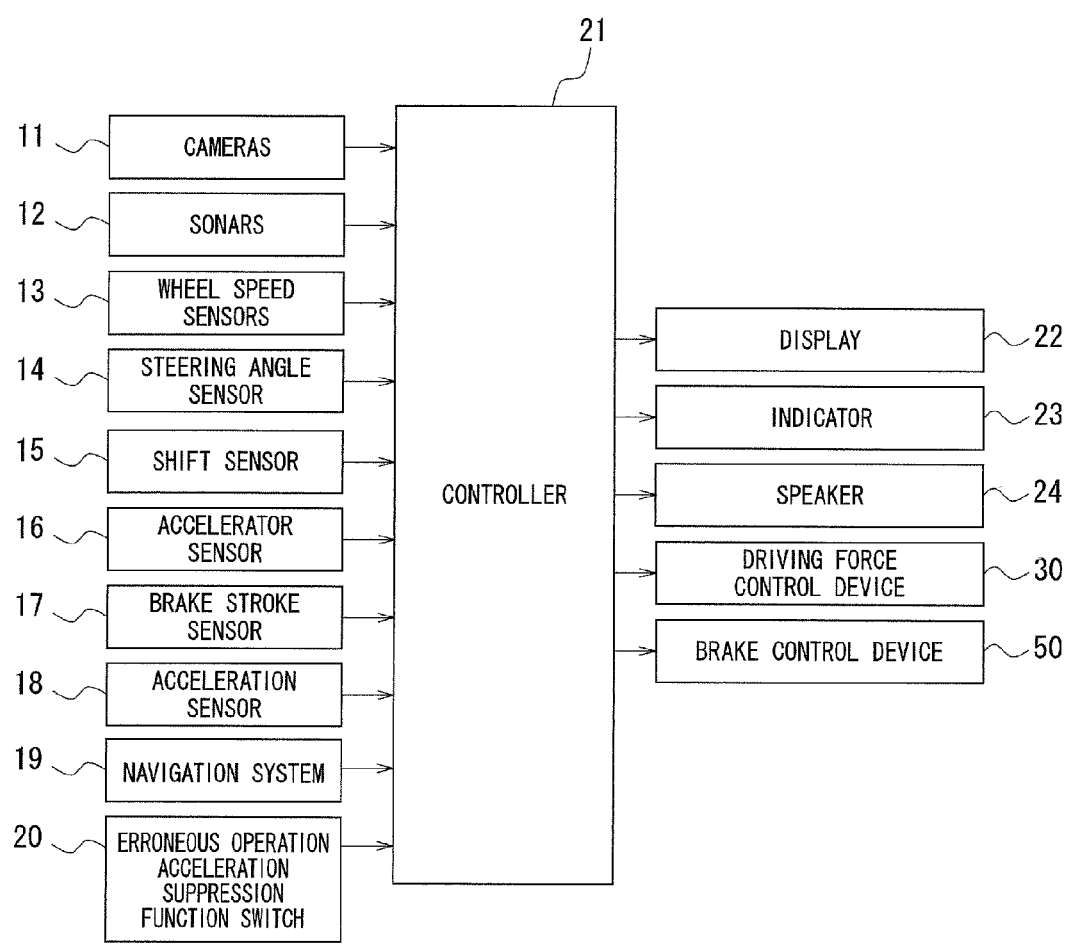
FIG. 1 is a schematic configuration diagram illustrative of an erroneous operation acceleration suppression device.

FIG. 1 is a schematic configuration diagram illustrative of an erroneous operation acceleration suppression device.

The erroneous operation acceleration suppression device in the present embodiment includes cameras 11, sonars 12, wheel speed sensors 13, a steering angle sensor 14, a shift sensor 15, an accelerator sensor 16, a brake stroke sensor 17, an acceleration sensor 18, a navigation system 19, an erroneous operation acceleration suppression function switch 20, and a controller 21.

The cameras 11 are provided at four locations, that is on the front, the rear, the left side, and the right side, of a vehicle body and are each a high-resolution wide-angle camera. When distinguishing between the four cameras, the camera provided on the front of the vehicle body will be referred to as a front camera 11F, the camera provided on the rear of the vehicle body will be referred to as a rear camera 11R, the camera provided on the left side of the vehicle body will be referred to as a left-side camera 11SL, and the camera provided on the right side of the vehicle body will be referred to as a right-side camera 11SR.

Figure 2:
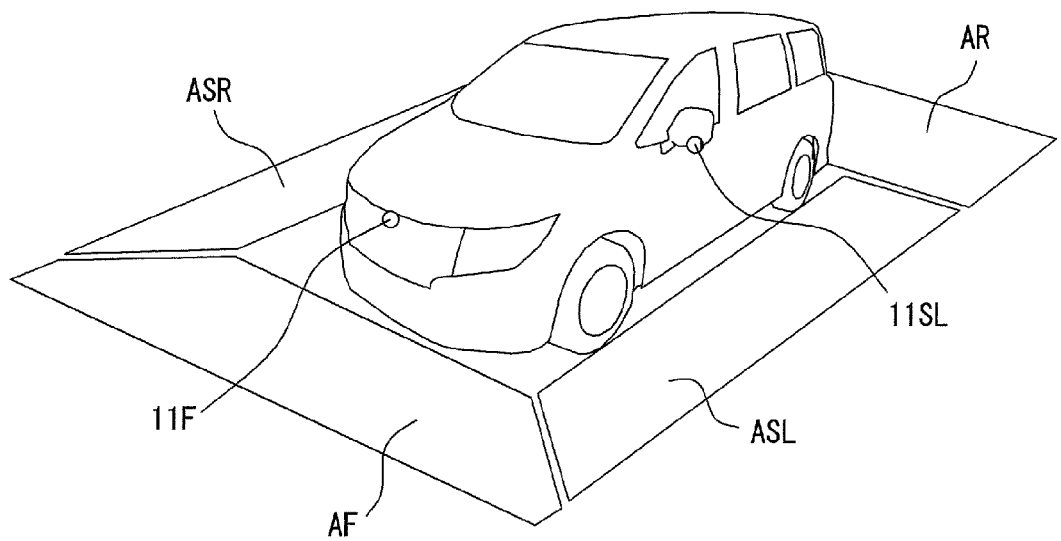
FIG. 2 is a diagram illustrative of an arrangement of a front camera 11F and a left-side camera 11SL.

FIG. 2 is a diagram illustrative of the arrangement of the front camera 11F and the left-side camera 11SL. The front camera 11F is arranged, for example, on a front grille and images at least a road surface ahead the vehicle body. The rear camera 11R is arranged, for example, on a back door finisher and images at least a road surface rearward the vehicle body. The front camera 11F and the rear camera 11R each have a horizontal view angle of 180 degrees. The left-side camera 11SL is arranged on a left door mirror and images at least a road surface on the left side of the vehicle body. The left-side camera 11SL has an auxiliary illuminator, for example, in the form of infrared LEDs, for illuminating the vicinity of a front-left wheel. The right-side camera 11SR is arranged on a right door mirror and images at least a road surface on the right side of the vehicle body. The cameras 11 respectively input the captured image data to the controller 21.

The sonars 12 are each configured to detect a distance to an object. Each sonar 12 drives a piezoelectric element to emit ultrasonic waves of, for example, about 40 to 70 kHz, receives ultrasonic waves reflected and returned from an object to measure a time required for the ultrasonic waves to go to and return from the object, converts the time into a distance to the object, and outputs the distance to the controller 21.

Figure 3A:
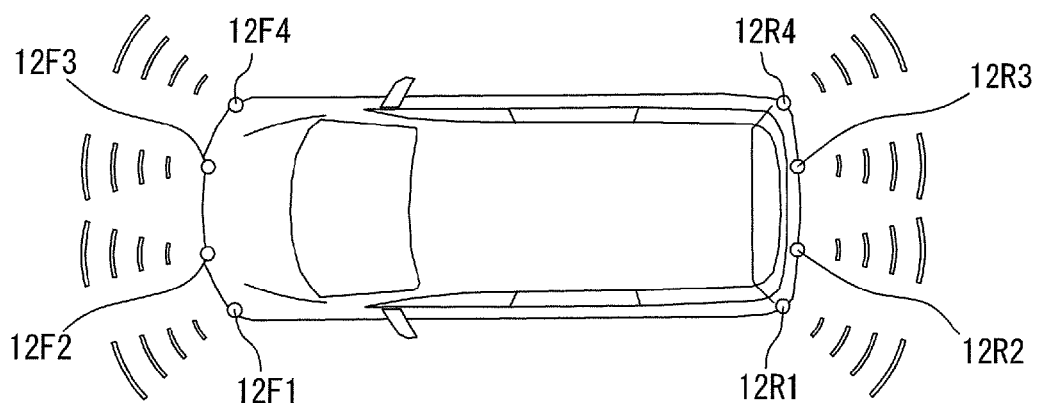
FIG. 3A and FIG. 3B are diagrams illustrative of an arrangement of sonars.
Figure 3B:
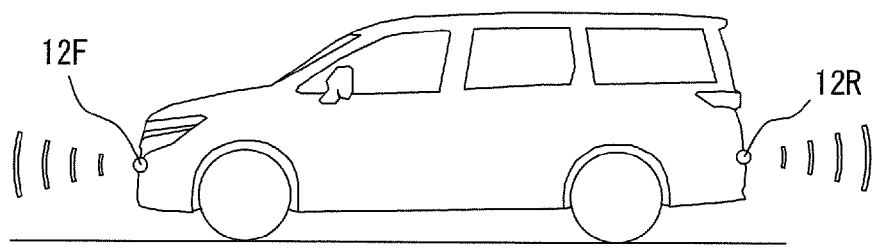

FIG. 3 is a diagram illustrative of the arrangement of the sonars. In the figure, FIG. 3A is a diagram of the vehicle body as seen from above and FIG. 3B is a diagram of the vehicle body as seen from side.

The sonars 12 are provided at eight locations in total that is at four locations on the front of the vehicle body and at four locations on the rear of the vehicle body. The four sonars provided on the front of the vehicle body are arranged on a front bumper at approximately regular intervals in a vehicle width direction, while the four sonars provided on the rear of the vehicle body are arranged on a rear bumper at approximately regular intervals in the vehicle width direction. When distinguishing between the respective sonars, the sonars provided on the front of the vehicle body will be referred to as front sonars 12F1, 12F2, 12F3, and 12F4 in an order from the left side of the vehicle body, while the sonars provided on the rear of the vehicle body will be referred to as rear sonars 12R1, 12R2, 12R3, and 12R4 in order from the left side of the vehicle body.

Of the four sonars arranged on the front bumper of the vehicle body, the middle two front sonars 12F2 and 12F3 are each set so that the center of a detection area faces forward in plan view, while the two front sonars 12F1 and 12F4 at both ends are each set so that the center of a detection area faces obliquely forward in plan view. Of the four sonars arranged on the rear bumper of the vehicle body, the middle two rear sonars 12R2 and 12R3 are each set so that the center of a detection area faces rearward in plan view, while the two rear sonars 12R1 and 12R4 at both ends are each set so that the center of a detection area faces obliquely rearward in plan view.

The wheel speed sensors 13 are configured to respectively detect wheel speeds $VW_{FL}$ to $VW_{RR}$ of wheels. For example, each wheel speed sensor 13 detects lines of magnetic force of a sensor rotor by a detection circuit, converts changes in magnetic field caused by the rotation of the sensor rotor into a current signal, and outputs the current signal to the controller 21. The controller 21 determines wheel speeds $VW_{FL}$ to $VW_{RR}$ from the input current signals.

The steering angle sensor 14 is in the form of a rotary encoder and is configured to detect a steering angle θs of a steering shaft. When a disc-shaped scale is rotated along with the steering shaft, the steering angle sensor 14 detects light transmitted through slits of the scale by two phototransistors and outputs pulse signals caused by the rotation of the steering shaft to the controller 21. The controller 21 determines a steering angle θs of the steering shaft from the input pulse signals. The steering angle sensor 14 processes a right turn as a positive value and a left turn as a negative value.

The shift sensor 15 is configured to detect a shift position of a transmission. For example, the shift sensor 15 includes plural Hall elements and outputs ON/OFF signals of the Hall elements to the controller 21. The controller 21 determines a shift position from a combination of the input ON/OFF signals.

The accelerator sensor 16 is configured to detect a pedal opening degree PPO (operation position) corresponding to a depression amount of an accelerator pedal. The accelerator sensor 16 is, for example, a potentiometer and it converts a pedal opening degree PPO of the accelerator pedal into a voltage signal and outputs the voltage signal to the controller 21. The controller 21 determines a pedal opening degree PPO of the accelerator pedal from the input voltage signal. The pedal opening degree PPO is 0% when the accelerator pedal is in its non-operating position, while the pedal opening degree PPO is 100% when the accelerator pedal is in its maximum operating position (stroke end).

The brake stroke sensor 17 is configured to detect an operation position corresponding to a depression amount of a brake pedal. The brake stroke sensor 17 is, for example, a potentiometer and it converts an operation position of the brake pedal into a voltage signal and outputs the voltage signal to the controller 21. The controller 21 determines an operation position of the brake pedal from the input voltage signal.

The acceleration sensor 18 is configured to detect an acceleration/deceleration in a vehicle longitudinal direction. For example, the acceleration sensor 18 detects a positional displacement of a movable electrode with respect to a stationary electrode as a change in capacitance and it converts the change in capacitance into a voltage signal proportional to an acceleration/deceleration and a direction and outputs the voltage signal to the controller 21. The controller 21 determines an acceleration/deceleration from the input voltage signal. The controller 21 processes acceleration as a positive value and deceleration as a negative value.

The navigation system 19 is configured to recognize a current position of an own vehicle and road information at the current position. The navigation system 19 has a GPS receiver and recognizes a position (latitude, longitude, altitude) and a travel direction of the own vehicle based on time differences between radio waves arriving from four or more GPS satellites. Then, referring to road information including road types, road alignments, lane widths, vehicle traffic directions, and the like, which are stored in a DVD-ROM drive or a hard disk drive, the navigation system 19 recognizes road information at the current position of the own vehicle and inputs the road information to the controller 21. Various data may be received from an infrastructure by using two-way radio communications (DSRC: Dedicated Short Range Communication) as a driving safety support system (DSSS: Driving Safety Support Systems).

The erroneous operation acceleration suppression function switch 20 is configured to detect ON/OFF of a suppression function for erroneous operation acceleration. The erroneous operation acceleration means that a driver erroneously depresses the accelerator pedal instead of the brake pedal, for example, in a parking area so that the vehicle is accelerated against the intention of the driver. The suppression function for erroneous operation acceleration represents a function of determining whether or not the depression is erroneously made, and performing a control to suppress acceleration of the vehicle whether it is clear that the depression is erroneously made. The erroneous operation acceleration suppression function switch 20 is provided in the vicinity of a dashboard so as to allow the driver to perform ON/OFF switching and outputs a voltage signal corresponding to ON/OFF to the controller 21, for example, via a normally-closed contact detection circuit. The controller 21 determines ON/OFF of the suppression function for erroneous operation acceleration from the input voltage signal.

The controller 21 is, for example, in the form of a microcomputer and is configured to carry out a later-described erroneous operation acceleration suppression control process based on detection signals from the respective sensors, thereby controlling driving of a display 22, an indicator 23, a speaker 24, a driving force control device 30, and a brake control device 50.

The display 22 is configured to display images around the vehicle captured by the respective cameras 11 and various types of information. The display 22 is provided in the vicinity of the dashboard so as to allow the driver to visually recognize and operate it and is, for example, in the form of a touch panel including a liquid crystal display and operation input portions. That is, the display 22 partially shields and transmits, via a drive circuit, light emitted from a backlight, thereby carrying out a desired display. Further, the display 22 senses a touch operation of a user on a screen by a resistive film-type or capacitance-type touch sensor and performs various settings based on a sensed touch position.

Images displayed by the display 22 include a front view, a rear view, a side blind view, a top view, and the like. In the front view, when the shift position is in a position other than a reverse position, an image from the front camera 11F can be cut out and displayed on an enlarged scale and further a predicted travel route line in accordance with the vehicle width, a distance reference line, and a steering angle, and the like can be described and displayed. In the rear view, when the shift position is in the reverse position, an image from the rear camera 11R can be cut out and displayed on an enlarged scale and further a predicted travel route line in accordance with the vehicle width, a distance reference line, and a steering angle, and the like can be described and displayed. In the side blind view, an image of an area in the vicinity of the front-left wheel, which is a driver's blind spot, of an image from the left-side camera 11SL can be cut out and displayed on an enlarged scale and further a vehicle forward reference line, a vehicle sideward reference line, and the like can be described and displayed. In the top view, images from the four cameras can be cut out and converted into a bird's-eye image so that the situation around the vehicle can be displayed. FIG. 2 illustrates one example of a display area of the top view. Herein, a display area based on the image from the front camera 11F is denoted by AF, a display area based on the image from the rear camera 11R is denoted by AR, a display area based on the image from the left-side camera 11SL is denoted by ASL, and a display area based on the image from the right-side camera 11SR is denoted by ASR.

The indicator 23 is a display lamp that, when the suppression function for erroneous operation acceleration has operated, that is the control has started, notifies to that effect. The indicator 23 is provided on an instrument panel so as to allow the driver to visually recognize it. The indicator 23 includes a predetermined symbol or an indication such as "The suppression system has operated upon the occurrence of depression erroneously made." and, when the suppression function for erroneous operation acceleration has operated, the symbol or the indication is turned on and off or continues to be turned on.

When the suppression function for erroneous operation acceleration has operated, that is the control has started, the speaker 24 outputs a notification sound to that effect. The speaker 25 is provided in a vehicle compartment and is, for example, a dynamic speaker. That is, an electrical signal is input to a coil coupled directly to a diaphragm to vibrate the diaphragm by vibration of the coil caused by electromagnetic induction, thereby emitting a sound corresponding to the electrical signal. When the suppression function for erroneous operation acceleration has operated, a notification sound of, for example, "beep beep beep" is produced.

The driving force control device 30 is configured to control the driving force of a rotational drive source. For example, when the rotational drive source is an engine, the engine output (rotational speed and engine torque) is controlled by adjusting the opening degree of a throttle valve, the fuel injection amount, the ignition timing, and the like. When the rotational drive source is a motor, the motor output (rotational speed and motor torque) is controlled via an inverter.

As one example of the driving force control device 30, the configuration of an electronically controlled throttle that controls the opening degree of the throttle valve will be described.

Figure 4:
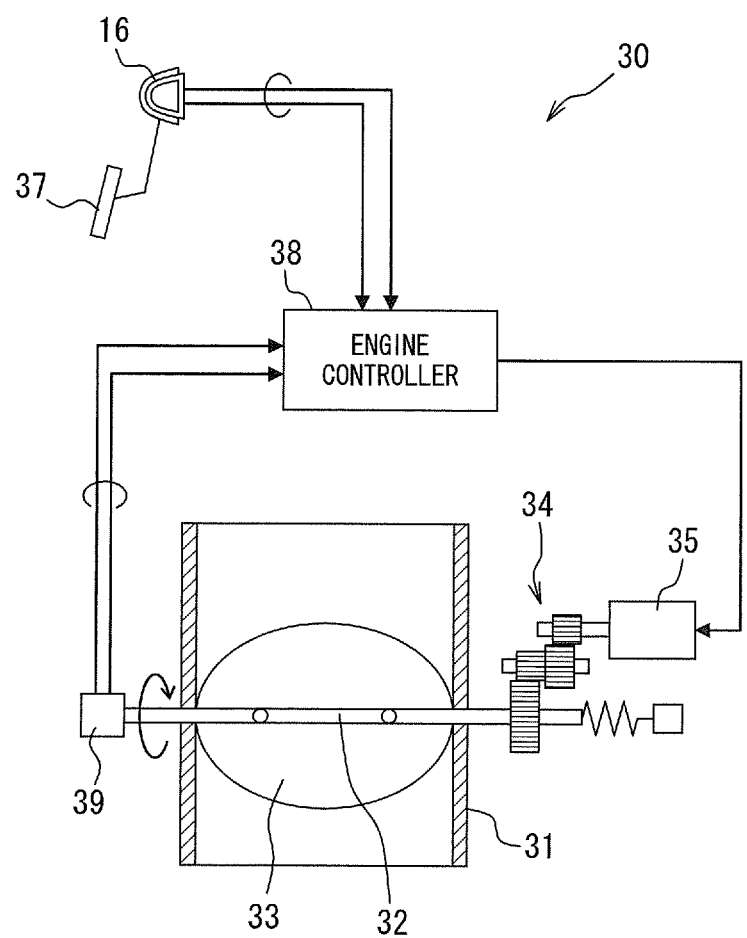
FIG. 4 is a system configuration diagram of an electronically controlled throttle system.

FIG. 4 is a system configuration diagram of an electronically controlled throttle system. In an intake duct 31 (for example, an intake manifold), a throttle shaft 32 extending in a diameter direction is rotatably supported and a disc-shaped throttle valve 33 having a diameter less than an inner diameter of the intake duct 31 is fixed to the throttle shaft 32. A throttle motor 35 is coupled to the throttle shaft 32 via speed reduction gears 34. Therefore, when the throttle motor 35 is rotated to change a rotation angle of the throttle shaft 32, the throttle valve 33 closes or opens the inside of the intake duct 31. That is, when a surface direction of the throttle valve 33 is aligned with a direction perpendicular to an axis of the intake duct 31, the throttle opening degree is in its fully closed position, while, when the surface direction of the throttle valve 33 is aligned with the axial direction of the intake duct 31, the throttle opening degree is in its fully opened position. In order to allow the throttle valve 33 to open by a predetermined amount from its fully closed position when abnormality has occurred in the throttle motor 35, a motor drive system, an accelerator sensor 16 system, a throttle sensor 39 system, or the like, the throttle shaft 32 is mechanically biased in its open direction.

The throttle sensor 39 has two systems and is configured to detect a throttle opening degree SPO of the throttle valve 33. The throttle sensor 39 is, for example, a potentiometer and it converts a throttle opening degree of the throttle valve 33 into a voltage signal and outputs the voltage signal to an engine controller 38. The engine controller 38 determines a throttle opening degree SPO of the throttle valve 33 from the input voltage signal. The throttle opening degree SPO is 0% when the throttle valve 33 is in its fully closed position, while the throttle opening degree SPO is 100% when the throttle valve 33 is in its fully opened position.

The engine controller 38, in general, is configured to set a target throttle opening degree SPO* in accordance with a pedal opening degree PPO and sets a motor control amount in accordance with a difference ΔPO between the target throttle opening degree SPO* and an actual throttle opening degree SPO. Then, the engine controller 38 is configured to convert the motor control amount into a duty cycle and controls driving of the throttle motor 35 in accordance with a pulse current value. On the other hand, when a drive command is received from the controller 31, the engine controller 38 controls driving of the throttle motor 35, with priority given to the drive command. For example, when a drive command to reduce a driving force is received, the engine controller 38 controls driving of the throttle motor 35 while making a correction to reduce a target throttle opening degree SPO* which corresponds to a pedal opening degree PPO.

Heretofore, the description has been made of the driving force control device 30.

Next, the brake control device 50 will be described. The brake control device 50 is configured to control braking forces for the respective wheels. For example, the fluid pressures of wheel cylinders provided for the respective wheels are controlled, for example, by a brake actuator for use in anti-skid control (ABS), traction control (TCS), stability control (VDC: Vehicle Dynamics Control), and the like. As one example of the brake control device 50, the configuration of a brake actuator will be described.

Figure 5:
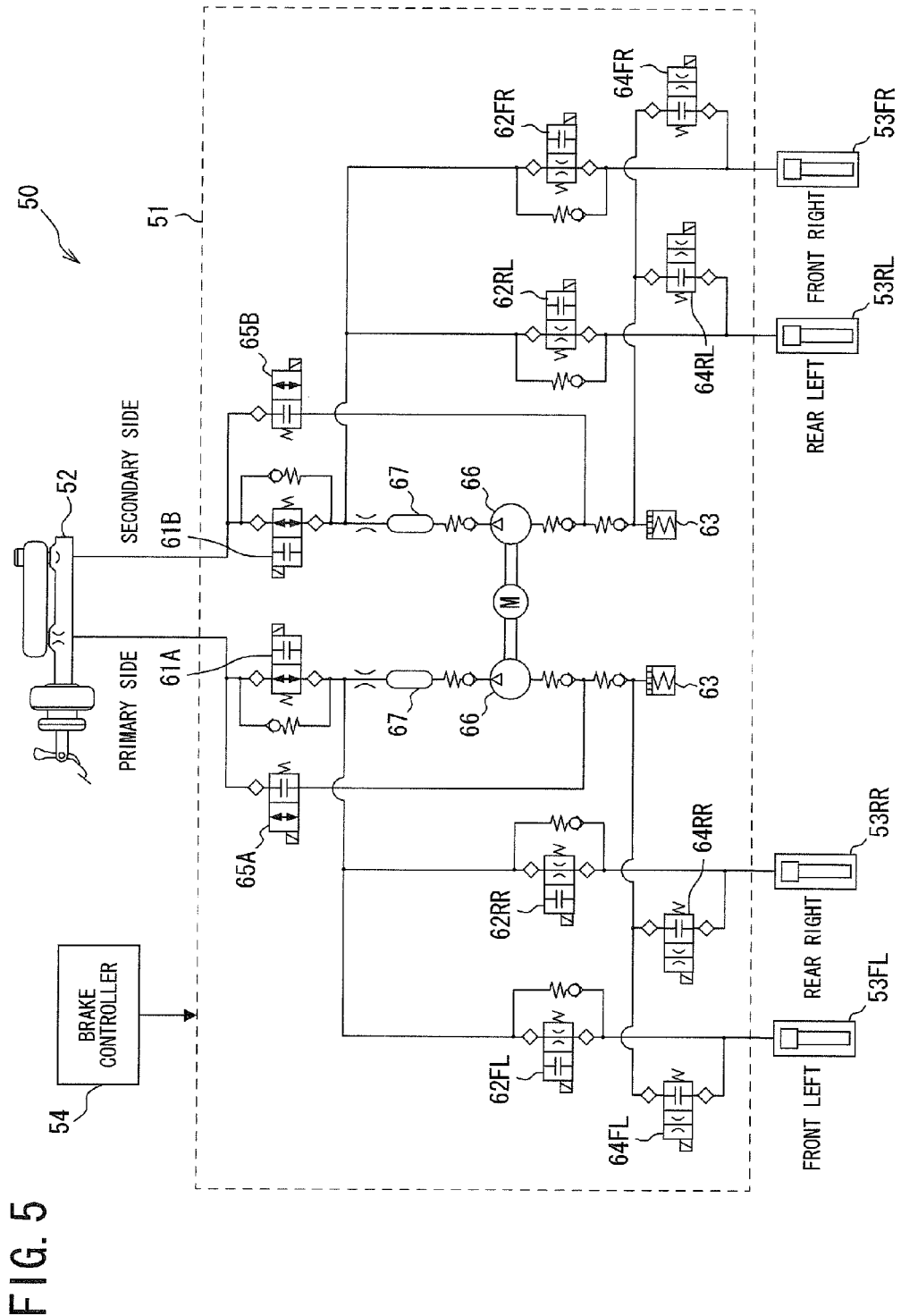
FIG. 5 is a schematic configuration diagram of a brake actuator.

FIG. 5 is a schematic configuration diagram of a brake actuator. A brake actuator 51 is interposed between a master cylinder 52 and wheel cylinders 53FL to 53RR. The master cylinder 52 is of a tandem type that generates fluid pressures for two systems in accordance with a pedal depression force by the driver, wherein a diagonal split system is employed in which the primary side communicates with the front-left and rear-right wheel cylinders 53FL and 53RR, while the secondary side communicates with the front-right and rear-left wheel cylinders 53FR and 53RL.

The wheel cylinders 53FL to 53RR are each housed in a disk brake that generates a braking force by squeezing a disk rotor between brake pads, or in a drum brake that generates a braking force by pressing brake shoes against an inner peripheral surface of a brake drum. The primary side includes a first gate valve 61A, an inlet valve 62FL (62RR), an accumulator 63, an outlet valve 64FL (64RR), a second gate valve 65A, a pump 66, and a damper chamber 67.

The first gate valve 61A is a normally-open valve and is capable of closing a channel between the master cylinder 52 and the wheel cylinder 53FL (53RR). The inlet valve 62FL (62RR) is a normally-open valve and is capable of closing the channel between the first gate valve 61A and the wheel cylinder 53FL (53RR). The accumulator 63 communicates with the channel between the wheel cylinder 53FL (53RR) and the inlet valve 62FL (62RR). The outlet valve 64FL (64RR) is a normally-closed valve and is capable of opening a channel between the wheel cylinder 53FL (53RR) and the accumulator 63. The second gate valve 65A is a normally-closed valve and is capable of opening a channel communicating with the channel between the master cylinder 52 and the first gate valve 61A and with the channel between the accumulator 63 and the outlet valve 64FL (64RR). The pump 66 has an intake side communicating with the channel between the accumulator 63 and the outlet valve 64FL (64RR) and a discharge side communicating with the channel between the first gate valve 61A and the inlet valve 62FL (62RR). The damper chamber 67 is provided on the discharge side of the pump 66 and serves to suppress pulsation of a discharged brake fluid and to weaken pedal vibration.

Like the primary side, the secondary side also includes a first gate valve 61B, an inlet valve 62FR (62RL), an accumulator 63, an outlet valve 64FR (64RL), a second gate valve 65B, a pump 66, and a damper chamber 67. The first gate valves 61A and 61B, the inlet valves 62FL to 62RR, the outlet valves 64FL to 64RR, and the second gate valves 65A and 65B are each a two-port two-position switching/single solenoid/spring offset-type electromagnetically operated valve. The first gate valves 61A and 61B and the inlet valves 62FL to 62RR are each configured to open the channel in its de-energized normal position, while the outlet valves 64FL to 64RR and the second gate valves 65A and 65B are each configured to close the channel in its de-energized normal position.

The accumulator 63 is configured with a spring-type accumulator in which a compression spring faces a piston in a cylinder. The pump 66 is configured as a displacement-type pump, such as a gear pump or a piston pump, capable of ensuring an approximately constant discharge rate regardless of load pressure. With the configuration described above, the primary side will be described by way of example. When the first gate valve 61A, the inlet valve 62FL (62RR), the outlet valve 64FL (64RR), and the second gate valve 65A are all in their de-energized normal positions, the fluid pressure from the master cylinder 52 is directly transmitted to the wheel cylinder 53FL (53RR) so that normal braking is achieved.

Even with the brake pedal being in a non-operating state, by energizing the first gate valve 61A to close it, by energizing the second gate valve 65A to open it, and further by driving the pump 66 while maintaining the inlet valve 62FL (62RR) and the outlet valve 64FL (64RR) in their de-energized normal positions, the fluid pressure in the master cylinder 52 is sucked into the pump 66 via the second gate valve 65A and then the discharged fluid pressure is transmitted to the wheel cylinder 53FL (53RR) via the inlet valve 62FL (62RR), thereby achieving an increase in pressure.

When the inlet valve 62FL (62RR) is energized to be closed while the first gate valve 61A, the outlet valve 64FL (64RR), and the second gate valve 65A are in their de-energized normal positions, the channel from the wheel cylinder 53FL (53RR) to the master cylinder 52 and the channel from the wheel cylinder 53FL (53RR) to the accumulator 63 are blocked so that the fluid pressure in the wheel cylinder 53FL (53RR) is maintained.

Further, when the inlet valve 62FL (62RR) is energized to be closed and the outlet valve 64FL (64RR) is energized to be opened while the first gate valve 61A and the second gate valve 65A are in their de-energized normal positions, the fluid pressure in the wheel cylinder 53FL (53RR) flows into the accumulator 63 so as to be reduced. The fluid pressure having flowed into the accumulator 63 is sucked by the pump 66 and returned to the master cylinder 52. Since the operation of normal braking, the operation of increasing the pressure, the operation of maintaining the pressure, and the operation of reducing the pressure on the secondary side are the same as those on the primary side, a detailed description thereof will be omitted.

A brake controller 54 is configured to control driving of the first gate valves 61A and 61B, the inlet valves 62FL to 62RR, the outlet valves 64FL to 64RR, the second gate valves 65A and 65B, and the pumps 66, thereby increasing, maintaining, and reducing the fluid pressures in the wheel cylinders 53FL to 53RR.

In the present embodiment, the diagonal split system is employed in which the brake system is split into the front-left and rear-right system and the front-right and rear-left system. However, the present invention is not limited to this. A front/rear split system may alternatively be employed in which the brake system is split into a front-left and front-right system and a rear-left and rear-right system.

In the present embodiment, the spring-type accumulator 63 is employed. However, the present invention is not limited to this. Since it is satisfactory as long as the brake fluid drawn from the wheel cylinders 53FL to 53RR can be temporarily stored and the pressure reduction can be efficiently performed, any type of accumulator may be used, such as a dead weight type, a gas compression direct pressure type, a piston type, a metal bellows type, a diaphragm type, a bladder type, or an in-line type.

In the present embodiment, the first gate valves 61A and 61B and the inlet valves 62FL to 62RR are configured to open the channels in their de-energized normal positions and the outlet valves 64FL to 64RR and the second gate valves 65A and 65B are configured to close the channels in their de-energized normal positions. However, the present invention is not limited to this. Since the point is that it is satisfactory as long as the respective valves can be opened and closed, the first gate valves 61A and 61B and the inlet valves 62FL to 62RR may be configured to open the channels in their energized offset positions and the outlet valves 64FL to 64RR and the second gate valves 65A and 65B may be configured to close the channels in their energized offset positions.

The brake controller 54, in general, is configured to control the fluid pressures in the wheel cylinders 53FL to 53RR by controlling driving of the brake actuator 51 in accordance with an anti-skid control, a traction control, and a stability control. On the other hand, when a drive command is received from the controller 21, the brake controller 54 controls driving of the brake actuator 51 with priority being given to the drive command. For example, when a drive command to increase the pressure in a given one of the wheel cylinders for the four wheels is received, the brake controller 54 controls driving of the brake actuator 51 while making a correction to increase a normal target fluid pressure.

Heretofore, the description has been made of the brake control device 50.

Figure 6:
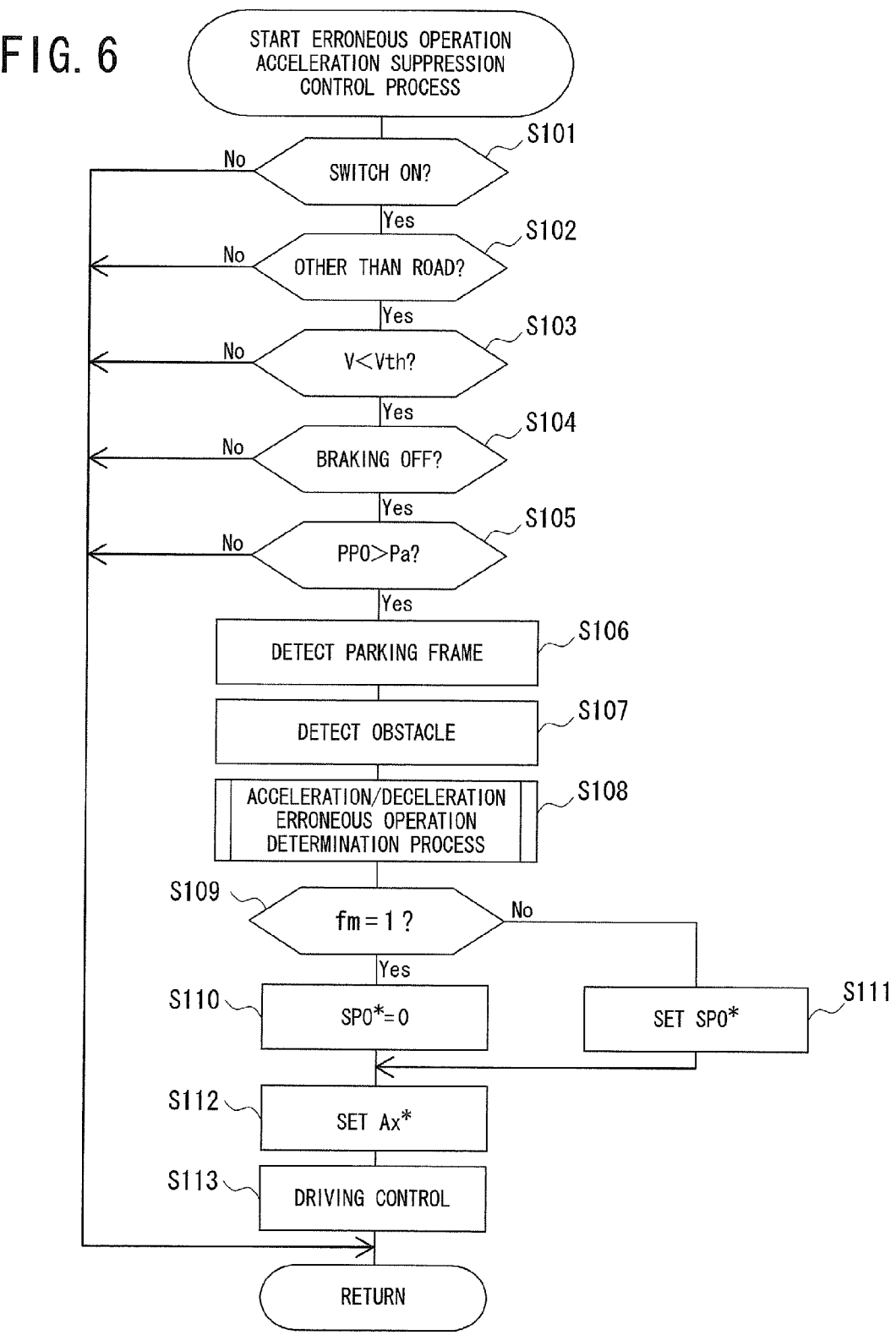
FIG. 6 is a flowchart illustrative of an erroneous operation acceleration suppression control process.

Next, an erroneous operation acceleration suppression control process carried out by the controller 21 at every predetermined time (for example, 10 msec) will be described. FIG. 6 is a flowchart illustrative of the erroneous operation acceleration suppression control process.

First, at step S101, it is determined whether or not the erroneous operation acceleration suppression function switch 20 is ON. Herein, when the erroneous operation acceleration suppression function switch 20 is ON, it is determined that the driver wishes for the erroneous operation acceleration suppression function, and the process proceeds to step S102. On the other hand, when the erroneous operation acceleration suppression function switch 20 is OFF, it is determined that the driver does not wish for the erroneous operation acceleration suppression function, and the process directly returns to a predetermined main program.

At step S102, it is determined whether or not a current position of the own vehicle is on other than a road widely offered to the public in general. This determination is made for determining whether or not the own vehicle is located in a parking lot or in an area having a parking space. For example, the determination is made based on a current position of the own vehicle and road information at the current position recognized by the navigation system 19 or based on image data captured by the cameras 11. In the case of the determination based on the image data captured by the cameras 11, it is determined, for example, upon detecting an intersection element or a travel lane, that the current position of the own vehicle is located on a road. Herein, when the current position of the own vehicle is on other than a road, it is determined that an activation condition for the erroneous operation acceleration suppression function is satisfied, and the process proceeds to step S103. On the other hand, when the current position of the own vehicle is on a road, it is determined that the activation condition for the erroneous operation acceleration suppression function is not satisfied, and the process directly returns to the predetermined main program.

At step S103, it is determined whether or not a vehicle speed V is less than a predetermined vehicle speed threshold value Vth. The vehicle speed threshold value Vth corresponds to a maximum value of a vehicle speed V which is used, for example, when parking in a parking frame or starting to move (starting to travel) from the parking frame in a parking area, and is set to, for example, about 15 km/h. Herein, when a result of the determination is V<Vth, it is determined that an activation condition for the erroneous operation acceleration suppression function is satisfied, and the process proceeds to step S104. On the other hand, when the result of the determination is V<=Vth, since the travel state has already been shifted to a normal travel state, it is determined that the activation condition for the erroneous operation acceleration suppression function is not satisfied, and the process directly returns to the predetermined main program.

At step S104, it is determined whether or not braking is OFF, that is whether or not the brake pedal is in its non-operating state. Herein, when braking is OFF, it is determined that an activation condition for the erroneous operation acceleration suppression function is satisfied, and the process proceeds to step S105. On the other hand, when braking is ON, since the vehicle is not accelerated in the first place, it is determined that the activation condition for the erroneous operation acceleration suppression function is not satisfied, and the process directly returns to the predetermined main program.

At step S105, it is determined whether or not a pedal opening degree PPO of the accelerator pedal is greater than or equal to a predetermined opening degree threshold value Pth. The opening degree threshold value Pa is a threshold value for determining whether or not the driver is depressing the accelerator pedal, and is set to, for example, about 3%. Herein, when a result of the determination is PPO>Pa, it is determined that an activation condition for the erroneous operation acceleration suppression function is satisfied, and the process proceeds to step S106. On the other hand, when the result of the determination is PPO<=Pa, since the vehicle is not accelerated in the first place, it is determined that the activation condition for the erroneous operation acceleration suppression function is not satisfied, and the process directly returns to the predetermined main program.

At step S106, a parking frame is detected from image data captured by the cameras 11 and a parking frame certainty level indicative of its "parking frame likelihood" is determined. For example, at least a pair of segments facing each other in the longitudinal direction of the vehicle body is detected and a parking frame certainty level thereof is determined in accordance with a spaced-apart distance between the segments (frame width), lengths of the segments, angles of the segments, and the like. The parking frame certainty level is determined, for example, by three grades of "no detection", "low", and "high".

Figure 7:
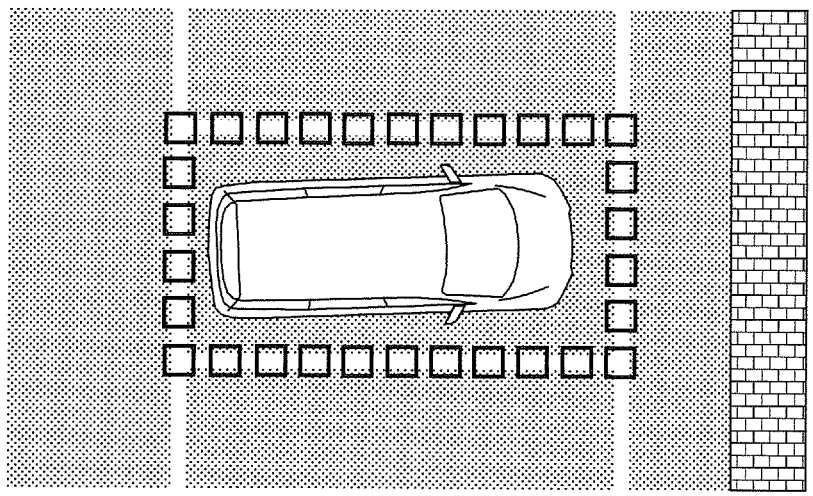
FIG. 7 is a diagram illustrative of a state where a parking frame is detected from the inside of the parking frame.

FIG. 7 is a diagram illustrative of a state where a parking frame has been detected from within a parking frame. Subsequently, at step S107, an obstacle present in a travel direction is detected by the sonars 12 and an obstacle certainty level indicative of its "obstacle likelihood" is determined. First, in accordance with a result of the detection by the plural sonars 12, the presence/absence of an obstacle is determined and, when the obstacle is present, its kind such as a wall, a vehicle, a curb or step, or a pole is also determined. Then, an obstacle certainty level is determined in accordance with the presence/absence of an obstacle, the kind of the obstacle, and a relative distance Ds to the obstacle. The obstacle certainty level is determined, for example, by three grades of "no detection", "low", and "high". For example, when a wall with a certain height and width is detected, the obstacle certainty level is set to "high". When a vehicle with a certain height and width is detected, the obstacle certainty level is set to "low" when the relative distance Ds is greater than a threshold value Dth (for example, 0.5 m), while the obstacle certainty level is set to "high" when the relative distance Ds is less than the threshold value Dth. When a curb or step with a low height or a pole with a narrow width is detected, the obstacle certainty level is set to "low".

Figure 8:
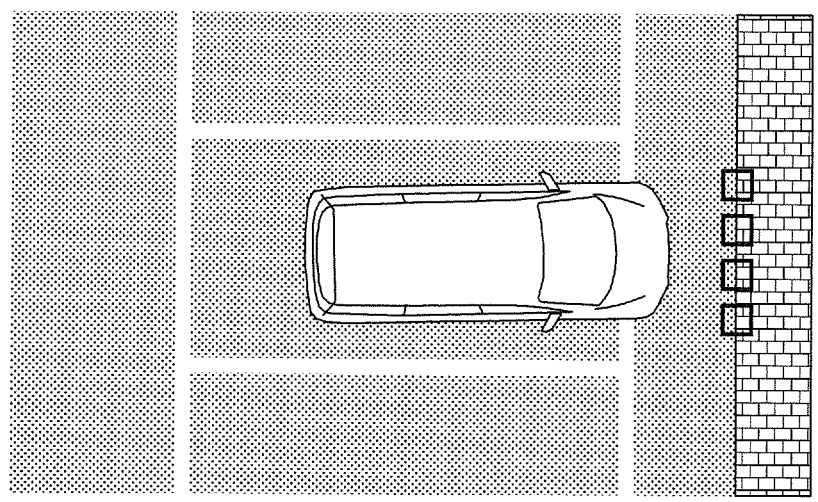
FIG. 8 is a diagram illustrative of a state where a wall existing ahead a vehicle body has been detected.

FIG. 8 is a diagram illustrative of a state where a wall that is present ahead the vehicle body has been detected. Subsequently, at step S108, a later-described acceleration/deceleration erroneous operation determination process is carried out to determine whether or not the accelerator pedal is erroneously depressed instead of the brake pedal. In this acceleration/deceleration erroneous operation determination process, a determination is made in accordance with a pedal opening degree PPO and a continuation time Te for which the pedal opening degree PPO is greater than an opening degree threshold value Pth. Then, an erroneous operation flag fm is set depending on whether or not the possibility of depression erroneously made is high. The erroneous operation flag fm is reset to fm=0 when it is uncertain about whether or not the depression is erroneously made, while the erroneous operation flag fm is set to fm=1 when the possibility of depression erroneously made is high.

Subsequently, at step S109, it is determined whether or not the erroneous operation flag is set to fm=1. Herein, when a result of the determination is fm=1, since the possibility is high that the accelerator pedal is erroneously depressed instead of the brake pedal, the process proceeds to step S110 so as to operate the suppression function for erroneous operation acceleration. On the other hand, when the result of the determination is fm=0, since it is uncertain about whether or not the depression is erroneously made, the process proceeds to step S111 so as to operate the suppression function for erroneous operation acceleration in accordance with a parking frame certainty level and an obstacle certainty level.

At step S110, a target throttle opening degree SPO is set to, for example, 0, and then the process proceeds to step S112.

At step S111, by referring to a table of FIG. 9, a target throttle opening degree SPO is set in accordance with a parking frame certainty level and an obstacle certainty level.

FIG. 9 is a table for use in setting a target throttle opening degree SPO*. Herein, when the obstacle certainty level is "no detection" and the parking frame certainty level is "no detection", no suppression to the target throttle opening degree SPO* is performed. When the obstacle certainty level is "no detection" and the parking frame certainty level is "low", the target throttle opening degree SPO* is limited to 25%. When the obstacle certainty level is "no detection" and the parking frame certainty level is "high", the target throttle opening degree SPO* is limited to 25%.

When the obstacle certainty level is "low" and the parking frame certainty level is "no detection", the target throttle opening degree SPO* is limited to 25%. When the obstacle certainty level is "low" and the parking frame certainty level is "low", the target throttle opening degree SPO is limited to 25%. When the obstacle certainty level is "low" and the parking frame certainty level is "high", the target throttle opening degree SPO* is limited to 0%.

When the obstacle certainty level is "high" and the parking frame certainty level is "no detection", the target throttle opening degree SPO* is limited to 0%. When the obstacle certainty level is "high" and the parking frame certainty level is "low", the target throttle opening degree SPO* is limited to 0%. When the obstacle certainty level is "high" and the parking frame certainty level is "high", the target throttle opening degree SPO* is limited to 0%.

After setting the target throttle opening degree SPO* as described above, the process proceeds to step S112. At step S112, by referring to a table of FIG. 10, a target deceleration Ax* is set in accordance with an obstacle certainty level.

FIG. 10 is a table for use in setting a target deceleration Ax*. Herein, when the obstacle certainty level is "no detection", since no braking operation is necessary, the target deceleration Ax* is set to 0. When the obstacle certainty level is "low", the target deceleration Ax* is set to 0.25 G so as to automatically apply braking. When the obstacle certainty level is "high", the target deceleration Ax* is set to 0.5 G so as to automatically apply braking.

At step S113, the throttle motor 35 is controlled to be driven via the engine controller 38, thereby effectuating the target throttle opening degree SPO*, and the brake actuator 51 is controlled to be driven via the brake controller 54, thereby effectuating the target deceleration Ax*. When operating the suppression function for erroneous operation acceleration by limiting the throttle opening degree SPO to 0% or 25% and generating the deceleration Ax of 0.25 G or 0.5 G on the vehicle, the display 22 or the indicator 23 displays to that effect or the speaker 24 outputs a notification sound to that effect.

After performing the various driving controls as described above, the process returns to the predetermined main program. The foregoing is the erroneous operation acceleration suppression control process.

Figure 11:
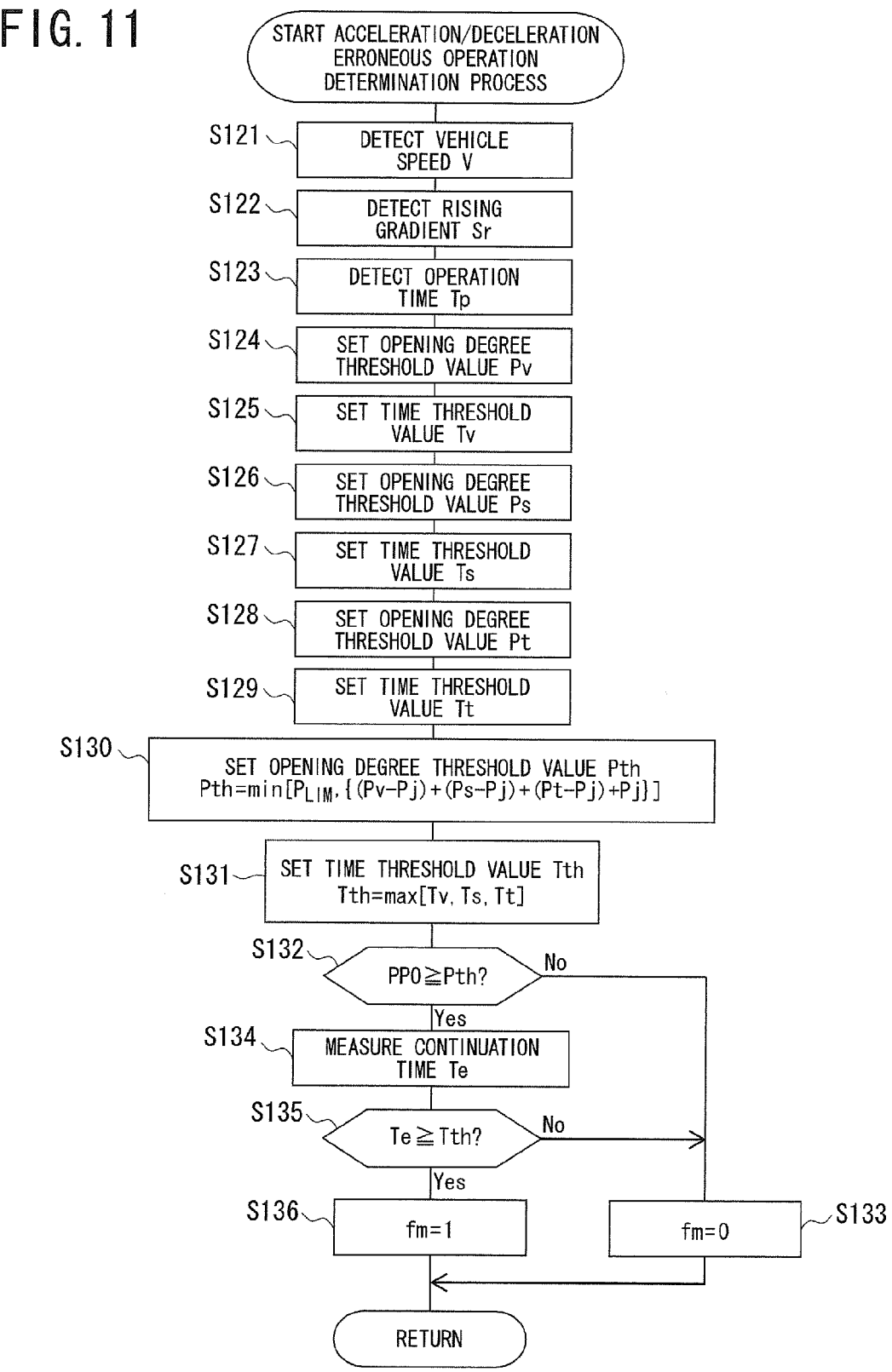
FIG. 11 is a flowchart illustrative of an acceleration/deceleration erroneous operation determination process.

Next, the acceleration/deceleration erroneous operation determination process will be described. FIG. 11 is a flowchart illustrative of the acceleration/deceleration erroneous operation determination process.

First, at step S121, a vehicle speed V of the own vehicle is detected in accordance with detection values of the wheel speed sensors 13. For example, an average value of wheel speeds $VW_{FL}$ to $VW_{RR}$, or the like is detected as a vehicle speed V.

Subsequently, at step S122, a rising gradient Sr % of a road surface is calculated in accordance with a detection value of the acceleration sensor 18. The rising gradient Sr is calculated by (vertical distance/horizontal distance)×100, wherein a rising gradient is expressed by a positive value (+) and a falling gradient is expressed by a negative value (−). For the rising gradient Sr, a 1 Hz low-pass filter treatment, for example, is performed.

Subsequently, at step S123, an operation time Tp, which is a time after the pedal opening degree PPO exceeds the opening degree threshold value Pa (for example, 3%), is detected. Specifically, a continuation time for which the pedal opening degree PPO is greater than the opening degree threshold value Pa is measured by a timer and the timer measurement value is read in.

Subsequently, at step S124, by referring to a map of FIG. 12, an opening degree threshold value Pv is set in accordance with a vehicle speed V.

Figure 12:
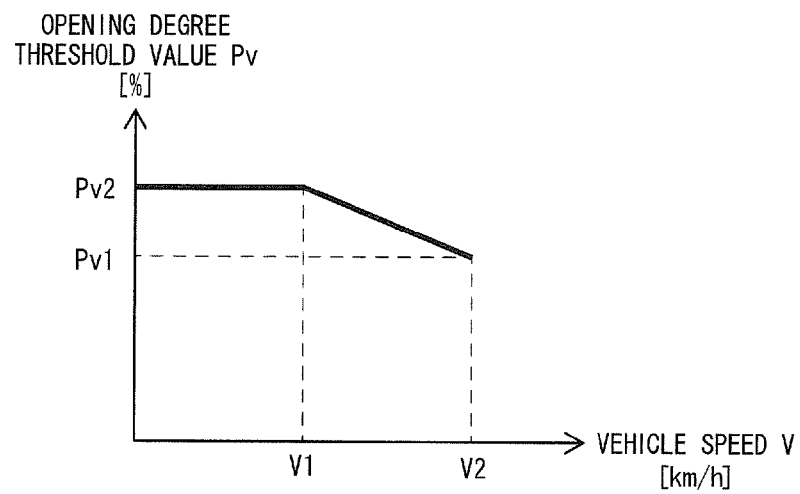
FIG. 12 is a map for use in setting an opening degree threshold value Pv.

FIG. 12 is a map for use in setting an opening degree threshold value Pv. In this map, for the vehicle speed V, V1 (for example, 8 km/h) and V2 (for example, 15 km/h) satisfying a relationship of 0<V1<V2 are determined in advance, while, for the opening degree threshold value Pv, Pv1 (for example, 50%) and Pv2 (for example, 70%) satisfying a relationship of 0<Pv1<Pv2 are determined in advance. When the vehicle speed V is in a range from 0 to V1, the opening degree threshold value Pv maintains Pv2, while, when the vehicle speed V is in a range from V1 to V2, the opening degree threshold value Pv decreases in a range from Pv2 to Pv1 as the vehicle speed V increases. When the vehicle speed V is greater than or equal to V2, the acceleration/deceleration erroneous operation determination process is not carried out.

Subsequently, at step S125, by referring to a map of FIG. 13, a time threshold value Tv is set in accordance with a vehicle speed V.

Figure 13:
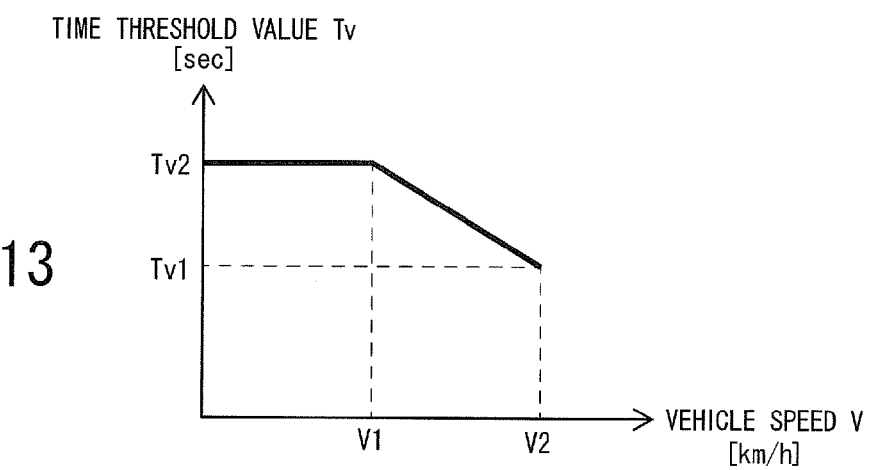
FIG. 13 is a map for use in setting a time threshold value Tv.

FIG. 13 is a map for use in setting a time threshold value Tv. In this map, for the vehicle speed V, V1 (for example, 8 km/h) and V2 (for example, 15 km/h) satisfying a relationship of 0<V1<V2 are determined in advance, while, for the time threshold value Tv, Tv1 (for example, 0.65 sec) and Tv2 (for example, 1.0 sec) satisfying a relationship of 0<Tv1<Tv2 are determined in advance. When the vehicle speed V is in a range from 0 to V1, the time threshold value Tv maintains Tv2, while, when the vehicle speed V is in a range from V1 to V2, the time threshold value Tv decreases in a range from Tv2 to Tv1 as the vehicle speed V increases. When the vehicle speed V is greater than or equal to V2, the acceleration/deceleration erroneous operation determination process is not carried out.

Subsequently, at step S126, by referring to a map of FIG. 14, an opening degree threshold value Ps is set in accordance with a rising gradient Sr.

Figure 14:
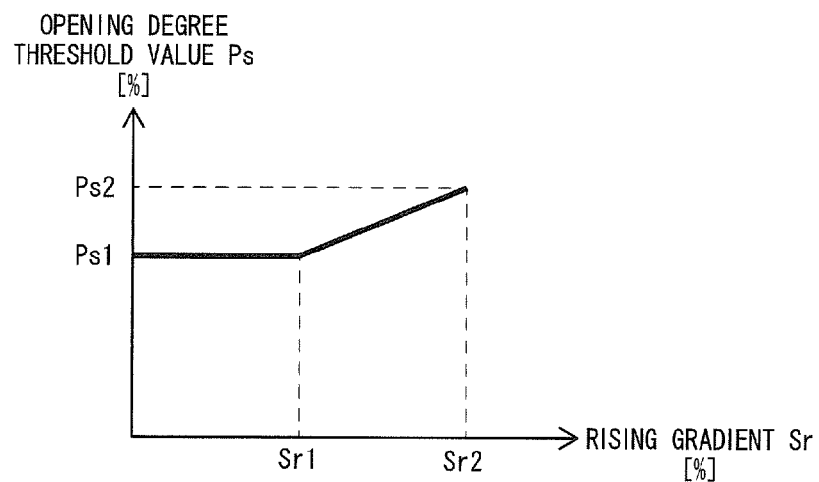
FIG. 14 is a map for use in setting an opening degree threshold value Ps.

FIG. 14 is a map for use in setting an opening degree threshold value Ps. In this map, for the rising gradient Sr, Sr1 (for example, 3%) and Sr2 (for example, 8%) satisfying a relationship of 0<Sr1<Sr2 are determined in advance, while, for the opening degree threshold value Ps, Ps1 (for example, 50%) and Ps2 (for example, 70%) satisfying a relationship of 0<Ps1<Ps2 are determined in advance. When the rising gradient Sr is in a range from 0 to Sr1, the opening degree threshold value Ps maintains Ps1, while, when the rising gradient Sr is in a range from Sr1 to Sr2, the opening degree threshold value Ps increases in a range from Ps1 to Ps2 as the rising gradient Sr increases. When the rising gradient Sr is greater than or equal to Sr2, the acceleration/deceleration erroneous operation determination process is not carried out.

Subsequently, at step S127, by referring to a map of FIG. 15, a time threshold value Ts is set in accordance with a rising gradient Sr.

Figure 15:
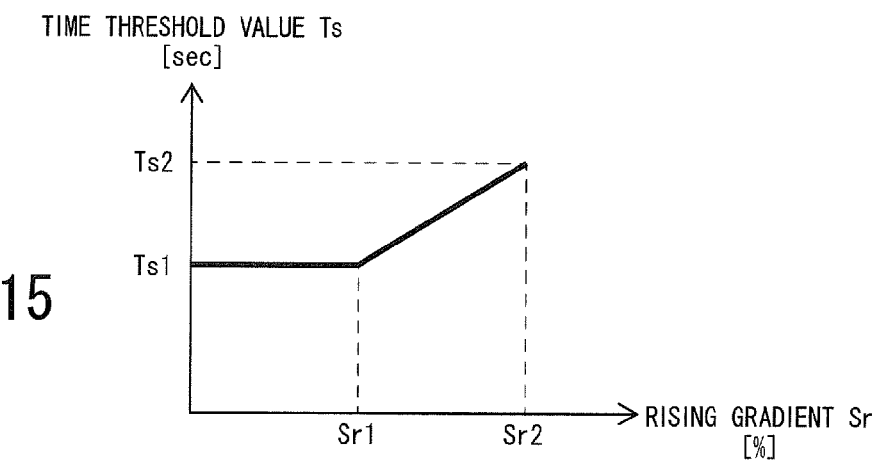
FIG. 15 is a map for use in setting a time threshold value Ts.

FIG. 15 is a map for use in setting a time threshold value Ts. In this map, for the rising gradient Sr, Sr1 (for example, 3%) and Sr2 (for example, 8%) satisfying a relationship of 0<Sr1<Sr2 are determined in advance, while, for the time threshold value Ts, Ts1 (for example, 0.65 sec) and Ts2 (for example, 1.0 sec) satisfying a relationship of 0<Ts1<Ts2 are determined in advance. When the rising gradient Sr is in a range from 0 to Sr1, the time threshold value Ts maintains Ts1, while, when the rising gradient Sr is in a range from Sr1 to Sr2, the time threshold value Ts increases in a range from Ts1 to Ts2 as the rising gradient Sr increases. When the rising gradient Sr is greater than or equal to Sr2, the acceleration/deceleration erroneous operation determination process is not carried out.

Subsequently, at step S128, by referring to a map of FIG. 16, an opening degree threshold value Pt is set in accordance with an operation time Tp.

Figure 16:
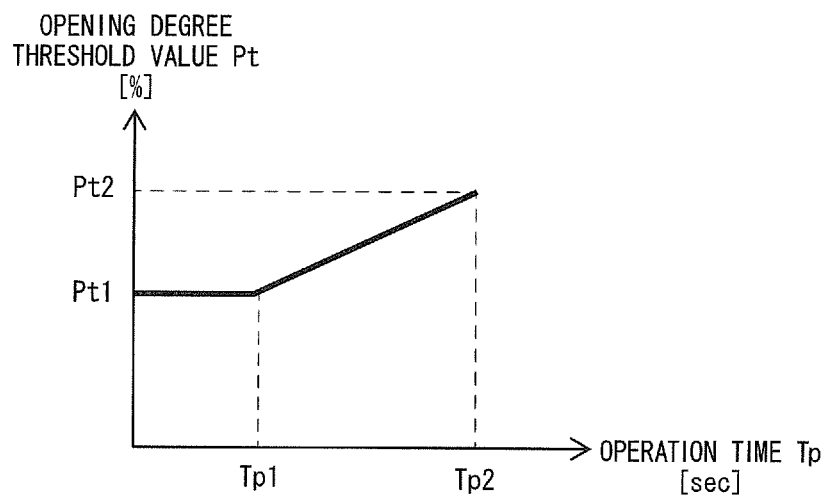
FIG. 16 is a map for use in setting an opening degree threshold value Pt.

FIG. 16 is a map for use in setting an opening degree threshold value Pt. In this map, for the operation time Tp, Tp1 (for example, 2 sec) and Tp2 (for example, 6 sec) satisfying a relationship of 0<Tp1<Tp2 are determined in advance, while, for the opening degree threshold value Pt, Pt1 (for example, 50%) and Pt2 (for example, 90%) satisfying a relationship of 0<Pt1<Pt2 are determined in advance. When the operation time Tp is in a range from 0 to Tp1, the opening degree threshold value Pt maintains Pt1, while, when the operation time Tp is in a range from Tp1 to Tp2, the opening degree threshold value Pt increases in a range from Pt1 to Pt2 as the operation time Tp increases. When the operation time Tp is greater than or equal to Tp2, the acceleration/deceleration erroneous operation determination process is not carried out.

Subsequently, at step S129, by referring to a map of FIG. 17, a time threshold value Tt is set in accordance with an operation time Tp.

Figure 17:
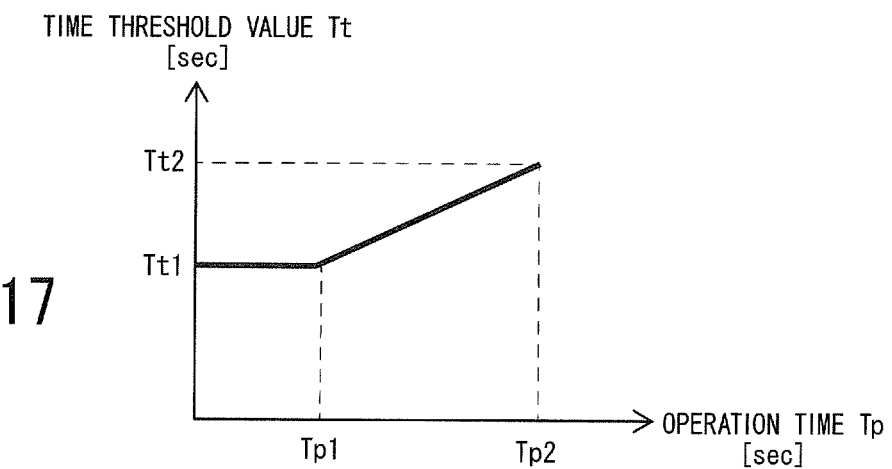
FIG. 17 is a map for use in setting a time threshold value Tt.

FIG. 17 is a map for use in setting a time threshold value Tt. In this map, for the operation time Tp, Tp1 (for example, 2 sec) and Tp2 (for example, 6 sec) satisfying a relationship of 0<Tp1<Tp2 are determined in advance, while, for the time threshold value Tt, Tt1 (for example, 0.65 sec) and Tt2 (for example, 1.0 sec) satisfying a relationship of 0<Tt1<Tt2 are determined in advance. When the operation time Tp is in a range from 0 to Tp1, the time threshold value Tt maintains Tt1, while, when the operation time Tp is in a range from Tp1 to Tp2, the time threshold value Tt increases in a range from Tt1 to Tt2 as the operation time Tp increases. When the operation time Tp is greater than or equal to Tp2, the acceleration/deceleration erroneous operation determination process is not carried out.

Subsequently, at step S130, a final opening degree threshold value Pth is set in accordance with the opening degree threshold values Pv, Ps, and Pt as described below. Herein, $P_{LIM}$ is a predetermined limiter and is set to, for example, about 90%. Further, Pj is a predetermined reference value and is set to, for example, about 50%.

$$Pth = \min[P_{LIM}, \{(Pv-Pj)+(Ps-Pj)+(Pt-Pj)+Pj\}]$$

According to the above formula, the final opening degree threshold value Pth is set by adding differences of the respective opening degree threshold values Pv, Ps, and Pt with respect to the reference value Pj to the reference value Pj to obtain a value and limiting the value by the limiter. That is, the final opening degree threshold value Pth is set by taking into account all of the opening degree threshold value Pv according to the vehicle speed V, the opening degree threshold value Ps according to the rising gradient Sr, and the opening degree threshold value Pt according to the operation time Tp.

Subsequently, at step S131, a final time threshold value Tth is set in accordance with the time threshold values Tv, Ts, and Tt as described below.

$$Tth=\max[Tv,Ts,Tt]$$

According to the above formula, the final time threshold value Tth is set by selecting, as a representative value, the time threshold value Tv according to the vehicle speed V, the time threshold value Ts according to the rising gradient Sr, or the time threshold value Tt according to the operation time Tp, whichever is the greatest.

Subsequently, at step S132, it is determined whether or not the pedal opening degree PPO is greater than or equal to the opening degree threshold value Pth. Herein, when a result of the determination is PPO<Pth, a determination is made that it is uncertain about whether or not the accelerator pedal is erroneously depressed instead of the brake pedal, and the process proceeds to step S133. On the other hand, when the result of the determination is PPO>=Pth, it is determined that there is a possibility of the accelerator pedal being erroneously depressed instead of the brake pedal, and the process proceeds to step S134.

At step S133, the erroneous operation flag is reset to fm=0, and then the process returns to the predetermined main program.

At step S134, a continuation time Te for which the pedal opening degree PPO is greater than the opening degree threshold value Pth is measured by a timer.

Subsequently, at step S135, it is determined whether or not the continuation time Te is greater than or equal to the time threshold value Tth. Herein, when a result of the determination is Te<Tth, a determination is made that it is uncertain about whether or not the accelerator pedal is erroneously depressed instead of the brake pedal, and the process proceeds to step S133. On the other hand, when the result of the determination is Te>=Tth, it is determined that the possibility is high that the accelerator pedal is erroneously depressed instead of the brake pedal, and the process proceeds to step S136. At step S136, the erroneous operation flag is set to fm=1, and then the process returns to the predetermined main program.

The foregoing is the acceleration/deceleration erroneous operation determination process.

(Action)

Next, the action in the first embodiment will be described. When the driver erroneously depresses the accelerator pedal instead of the brake pedal, for example, in a parking area, the vehicle is accelerated against the intention of the driver. In this event, since the driver thinks that the driver is depressing the brake pedal, it is presumed that the pedal opening degree PPO becomes relatively large and further that the depression time also becomes somewhat long.

Therefore, when the pedal opening degree PPO is greater than or equal to the opening degree threshold value Pth ("Yes" at step S132), the continuation time Te from the time point when the pedal opening degree PPO becomes greater than or equal to the opening degree threshold value Pth is measured by the timer (step S134). Then, when the continuation time Te is greater than or equal to the time threshold value Tth ("Yes" at step S135), it is determined that the driver is erroneously performing the accelerator operation instead of the brake operation, that is the depression is erroneously made.

Herein, the opening degree threshold value Pth and the time threshold value Tth which serve as reference values will be described.

Figure 18:
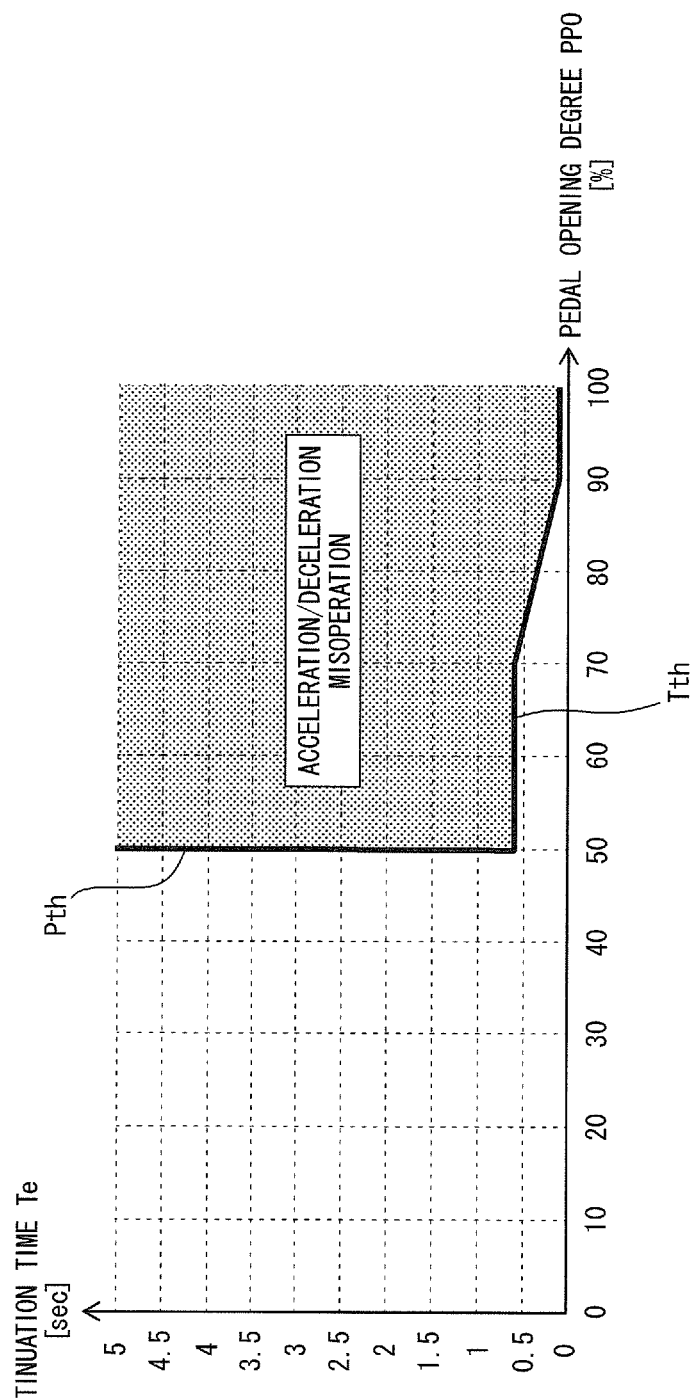
FIG. 18 is a diagram illustrative of an opening degree threshold value Pth and a time threshold value Tth which serve as reference values.

FIG. 18 is a diagram illustrative of the opening degree threshold value Pth and the time threshold value Tth which serve as reference values. The opening degree threshold value Pth as a reference for the pedal opening degree PPO is set to, for example, about 50%. The time threshold value Tth as a reference for the continuation time Te is set to a smaller value as the pedal opening degree PPO increases. The time threshold value Tth is, for example, about 0.65 sec when the pedal opening degree PPO is 50 to 70%, it is, for example, about 0.65 to 0.1 sec when the pedal opening degree PPO is 70 to 90%, and it is, for example, about 0.1 sec when the pedal opening degree PPO is 90% or greater. In an area where the pedal opening degree PPO is greater than the opening degree threshold value Pth and, in addition, the continuation time Te is greater than the time threshold value Tth, the pedal depression is determined to be erroneously made, that is to be an acceleration/deceleration erroneous operation. The reason for setting the time threshold value Tth to be smaller as the pedal opening degree PPO increases is that an area in which the pedal opening degree PPO is close to 100% is not often used in a normal driving operation and therefore that even when the continuation time Te is short, the pedal depression can be easily determined to be erroneously made.

When, as described above, the pedal opening degree PPO is greater than or equal to the opening degree threshold value Pth and its continuation time Te is greater than or equal to the time threshold value Tth, the erroneous operation flag is set to fm=1 (step S136). Then, when the erroneous operation flag has been set to fm=1 ("Yes" at step S109), the target throttle opening degree SPO* is set to 0 (step S110), thereby suppressing acceleration of the vehicle due to erroneous operation. Consequently, it is possible to suppress that the vehicle is accelerated due to the pedal depression erroneously made, which is against the intention of the driver.

Incidentally, the accelerator operation at the time of the pedal depression erroneously made tends to constantly change depending on a situation on the spot including various elements and thus is not unitary. Therefore, when the opening degree threshold value Pth and the time threshold value Tth are constantly set to fixed values, there is a possibility that it is not possible to accurately determine whether or not the operation is erroneously made.

Therefore, in the present embodiment, the vehicle speed V of the own vehicle, the rising gradient Sr of a road surface, and the accelerator operation time Tp by the driver are detected (steps S121 to S123) and the opening degree threshold value Pth and the time threshold value Tth are respectively made variable in accordance with the vehicle speed V, the rising gradient Sr, and the operation time Tp.

First, for the opening degree threshold value Pth, the opening degree threshold value Pv is set in accordance with the vehicle speed V (step S124), the opening degree threshold value Ps is set in accordance with the rising gradient Sr (step S126), and the opening degree threshold value Pt is set in accordance with the operation time Tp (step S128). Then, the opening degree threshold value Pth is set in accordance with the opening degree threshold values Pv, Ps, and Pt (step S130). For example, the final opening degree threshold value Pth is set by adding differences of the respective opening degree threshold values Pv, Ps, and Pt with respect to the reference value Pj to the reference value Pj to obtain a value and limiting the value by the limiter. In this manner, by reflecting all of the vehicle speed V, the rising gradient Sr, and the operation time Tp on the opening degree threshold value Pth, it is possible to set an appropriate opening degree threshold value Pth suitable for the situation.

On the other hand, for the time threshold value Tth, the time threshold value Tv is set in accordance with the vehicle speed V (step S125), the time threshold value Ts is set in accordance with the rising gradient Sr (step S127), and the time threshold value Tt is set in accordance with the operation time Tp (step S129). Then, the time threshold value Tth is set in accordance with the time threshold values Tv, Ts, and Tp (step S131). For example, the final time threshold value Tth is set by selecting, as a representative value, the time threshold value Tv, Ts, or Tp, whichever is the greatest. In this manner, by selecting the greatest value for the time threshold value Tth, it is made difficult to determine that the depression is erroneously made. Consequently, it is possible to more carefully determine whether or not the pedal depression is erroneously made, and thus to improve the determination accuracy.

Next, changes of the opening degree threshold value Pth and the time threshold value Tth in accordance with the respective elements of the vehicle speed V, the rising gradient Sr, and the operation time Tp will be described.

First, as the vehicle speed V decreases, the opening degree threshold value Pv is set greater. That is, by setting the opening degree threshold value Pth greater as the vehicle speed V decreases, it is made difficult to determine that the depression is erroneously made. This is because as the vehicle speed V decreases, the possibility of deep depression by the driver becomes higher even in a normal accelerator operation, that is not the depression erroneously made. Therefore, by setting the opening degree threshold value Pth greater as the vehicle speed V decreases, it is possible to suppress an incorrect determination that a normal accelerator operation is determined to be the erroneous depression, and thus it is possible to improve the determination accuracy.

As the rising gradient Sr increases, the opening degree threshold value Ps is set greater. That is, by setting the opening degree threshold value Pth greater as the rising gradient Sr increases, it is made difficult to determine that the depression is erroneously made. This is because as the rising gradient Sr increases, the possibility of deep depression by the driver becomes higher even in a normal accelerator operation, which is not the erroneous depression. Therefore, by setting the opening degree threshold value Pth greater as the rising gradient Sr increases, it is possible to suppress an incorrect determination that a normal accelerator operation is determined to be the erroneous depression, and thus it is possible to improve the determination accuracy.

As the operation time Tp increases, the opening degree threshold value Pt is set greater. That is, by setting the opening degree threshold value Pth greater as the operation time Tp increases, it is made difficult to determine that the depression is erroneously made. This is because as the operation time Tp increases, the possibility is considered to be higher that the driver is trying to control the vehicle speed V by an accelerator operation. Therefore, by setting the opening degree threshold value Pth greater as the operation time Tp increases, it is possible to suppress an incorrect determination that a normal accelerator operation is determined to be the erroneous depression, and thus it is possible to improve the determination accuracy.

On the other hand, as the vehicle speed V decreases, the time threshold value Tv is set greater. That is, by setting the time threshold value Tth greater as the vehicle speed V decreases, it is made difficult to determine that the depression is erroneously made. This is because as the vehicle speed V decreases, the possibility of deep depression by the driver becomes higher even in a normal accelerator operation, that is not the depression erroneously made. Therefore, by setting the time threshold value Tth greater as the vehicle speed V decreases, it is possible to suppress an incorrect determination that a normal accelerator operation is determined to be the erroneous depression, and thus it is possible to improve the determination accuracy.

As the rising gradient Sr increases, the time threshold value Ts is set greater. That is, by setting the time threshold value Tth greater as the rising gradient Sr increases, it is made difficult to determine that the depression is erroneously made. This is because as the rising gradient Sr increases, the possibility of deep depression by the driver becomes higher even in a normal accelerator operation, which is not the erroneous depression. Therefore, by setting the time threshold value Tth greater as the rising gradient Sr increases, it is possible to suppress that a normal accelerator operation is erroneously determined to be the depression erroneously made, and thus it is possible to improve the determination accuracy.

As the operation time Tp increases, the time threshold value Tt is set greater. That is, by setting the time threshold value Tth greater as the operation time Tp increases, it is made difficult to determine that the depression is erroneously made. This is because as the operation time Tp increases, the possibility is considered to be higher that the driver is trying to control the vehicle speed V by an accelerator operation. Therefore, by setting the time threshold value Tth greater as the operation time Tp increases, it is possible to suppress an incorrect determination that a normal accelerator operation is determined to be the erroneous depression, and thus it is possible to improve the determination accuracy.

As described above, since the opening degree threshold value Pth and the time threshold value Tth are respectively made variable in accordance with the vehicle speed V, the rising gradient Sr, and the operation time Tp, it is possible to set appropriate threshold values suitable for a situation on the spot. Therefore, using the opening degree threshold value Pth for a comparison with the pedal opening degree PPO and using the time threshold value Tth for a comparison with the continuation time Te, it is possible to improve the accuracy of determination as to whether or not the driver is erroneously performing an accelerator operation instead of a brake operation.

Modification

In the present embodiment, when setting the opening degree threshold value Pth, differences of the respective opening degree threshold values Pv, Ps, and Pt with respect to the reference value Pj are added to the reference value Pj to obtain a value and this value is limited by the limiter, so that the final opening degree threshold value Pth is set. However, the present invention is not limited to this. For example, the final opening degree threshold value Pth may be set by multiplying the respective opening degree threshold values Pv, Ps, and Pt by gains and then adding them together. In this event, the gains may be the same value or may be individual values for arbitrary weighting. Alternatively, an average value of the opening degree threshold values Pv, Ps, and Pt may be calculated and set as a final opening degree threshold value Pth. In short, any technique may be used as long as it can set a final opening degree threshold value Pth in consideration of all of the opening degree threshold values Pv, Ps, and Pt.

In the present embodiment, Pv and Tv according to the vehicle speed V are set, Ps and Ts according to the rising gradient Sr are set, and Pt and Tt according to the operation time Tp are set, and using these values, the opening degree threshold value Pth and the time threshold value Tth are set. However, the present invention is not limited to this. For example, a level Lv according to the vehicle speed V, a level Ls according to the rising gradient Sr, and a level Lt according to the operation time Tp may be set, for example, by 0 to 5 steps and a total level L may be set by adding the levels Lv, Ls, and Lt and converted into a map, for example, like the one illustrated in FIG. 18. Then, by referring to this map, a determination may be made in accordance with a pedal opening degree PPO and a continuation time Te as to whether or not the depression is erroneously made.

As described above, the accelerator sensor 16 corresponds to an "operation amount detection unit", the process at step S134 corresponds to a "continuation time detection unit", the process at step S135 corresponds to a "erroneous operation determination unit", and the process at step S121 corresponds to a "vehicle speed detection unit". Further, the process at step S122 corresponds to a "gradient detection unit", the process at step S123 corresponds to an "operation time detection unit" and the processes at step S130 and step S131 correspond to a "threshold value setting unit". Further, the process at step S124 corresponds to a "first operation amount threshold value setting unit", the process at step S126 corresponds to a "second operation amount threshold value setting unit", and the process at step S128 corresponds to a "third operation amount threshold value setting unit". Further, the process at step S125 corresponds to a "first time threshold value setting unit", the process at step S127 corresponds to a "second time threshold value setting unit", and the process at step S129 corresponds to a "third time threshold value setting unit". Further, the processes at steps S110 and S112 correspond to a "braking/driving force control unit".

(Effect)

Next, the effects of the main part in the first embodiment will be described.

(1) The acceleration/deceleration erroneous operation determination device in the present embodiment is configured to detect a pedal opening degree PPO by a driver and a continuation time Te for which the pedal opening degree PPO is greater than an opening degree threshold value Pth and, when the continuation time Te exceeds a time threshold value Tth, the device determines that the driver is erroneously performing an accelerator operation instead of a brake operation. The acceleration/deceleration erroneous operation determination device in the present embodiment is configured to detect a vehicle speed V of an own vehicle, a rising gradient Sr of a road surface, and an accelerator operation time Tp by the driver and makes variable at least one of the opening degree threshold value Pth and the time threshold value Tth in accordance with the vehicle speed V, the rising gradient Sr, and the operation time Tp. Since, as described above, at least one of the opening degree threshold value Pth and the time threshold value Tth is made variable in accordance with the vehicle speed V, the rising gradient Sr, and the operation time Tp, it is possible to set appropriate threshold values suitable for a situation on the spot. Therefore, by using these opening degree threshold value Pth and time threshold value Tth, it is made possible to improve the accuracy in determination of whether or not the driver is erroneously performing an accelerator operation instead of a brake operation.

(2) The acceleration/deceleration erroneous operation determination device in the present embodiment is configured to set an opening degree threshold value Pv in accordance with a vehicle speed V, sets an opening degree threshold value Ps in accordance with a rising gradient Sr, and to set an opening degree threshold value Pt in accordance with an operation time Tp. Then, the device sets an opening degree threshold value Pth for a pedal opening degree PPO in accordance with all of the opening degree threshold values Pv, Ps, and Pt. In this manner, by reflecting all of the vehicle speed V, the rising gradient Sr, and the operation time Tp on the opening degree threshold value Pth, it is made possible to set an appropriate opening degree threshold value Pth suitable for the situation.

(3) The acceleration/deceleration erroneous operation determination device in the present embodiment is configured to set a time threshold value Tv in accordance with a vehicle speed V, sets a time threshold value Ts in accordance with a rising gradient Sr, and sets a time threshold value Tt in accordance with an operation time Tp. Then, the device sets the time threshold value Tv, Ts, or Tt, whichever is the greatest, as a time threshold value Tth for a continuation time Te. In this manner, by selecting the greatest value for the time threshold value Tth, it is made difficult to determine that the depression is erroneously made. Consequently, it is possible to more carefully determine whether or not the pedal depression is erroneously made, and thus to improve the determination accuracy.

(4) The acceleration/deceleration erroneous operation determination device in the present embodiment is configured to set an opening degree threshold value Pth greater as a vehicle speed V decreases. In this manner, by setting the opening degree threshold value Pth greater as the vehicle speed V decreases, it is made possible to suppress an incorrect determination that a normal accelerator operation is determined to be the erroneous depression, and thus it is possible to improve the determination accuracy.

(5) The acceleration/deceleration erroneous operation determination device in the present embodiment is configured to set an opening degree threshold value Pth greater as a rising gradient Sr increases. In this manner, by setting the opening degree threshold value Pth greater as the rising gradient Sr increases, it is made possible to suppress an incorrect determination that a normal accelerator operation is determined to be the erroneous depression, and thus it is possible to improve the determination accuracy.

(6) The acceleration/deceleration erroneous operation determination device in the present embodiment is configured to set an opening degree threshold value Pth greater as an operation time Tp increases. In this manner, by setting the opening degree threshold value Pth greater as the operation time Tp increases, it is made possible to suppress an incorrect determination that a normal accelerator operation is determined to be the erroneous depression, and thus it is possible to improve the determination accuracy.

(7) The acceleration/deceleration erroneous operation determination device in the present embodiment is configured to set a time threshold value Tth greater as a vehicle speed V decreases. In this manner, by setting the time threshold value Tth greater as the vehicle speed V decreases, it is possible to suppress an incorrect determination that a normal accelerator operation is determined to be the erroneous depression, and thus it is possible to improve the determination accuracy.

(8) The acceleration/deceleration erroneous operation determination device in the present embodiment is configured to set a time threshold value Tth greater as a rising gradient Sr increases. In this manner, by setting the time threshold value Tth greater as the rising gradient Sr increases, it is possible to suppress an incorrect determination that a normal accelerator operation is determined to be the erroneous depression, and thus it is possible to improve the determination accuracy.

(9) The acceleration/deceleration erroneous operation determination device in the present embodiment is configured to set a time threshold value Tth greater as an operation time Tp increases. In this manner, by setting the time threshold value Tth greater as the operation time Tp increases, it is possible to suppress an incorrect determination that a normal accelerator operation is determined to be the erroneous depression, and thus it is possible to improve the determination accuracy.

(10) The erroneous operation acceleration suppression control device in the present embodiment is configured to perform at least one of suppressing a vehicle driving force and generating a vehicle braking force when it is determined that a driver is erroneously performing an accelerator operation instead of a brake operation. In this manner, by suppressing the vehicle driving force or generating the vehicle braking force, it is possible to suppress that the vehicle is accelerated due to the pedal depression erroneously made, which is against the intention of the driver.

(11) The acceleration/deceleration erroneous operation determination method in the present embodiment is configured to detect a continuation time Te for which a pedal opening degree PPO by a driver is greater than an opening degree threshold value Pth and, when the continuation time Te exceeds a time threshold value Tth, the method determines that the driver is erroneously performing an accelerator operation instead of a brake operation. The method detects a vehicle speed V of an own vehicle, a rising gradient Sr of a road surface, and an accelerator operation time Tp by the driver and makes variable at least one of the opening degree threshold value Pth and the time threshold value Tth in accordance with the vehicle speed V, the rising gradient Sr, and the accelerator operation time Tp. Since, as described above, at least one of the opening degree threshold value Pth and the time threshold value Tth is made variable in accordance with the vehicle speed V, the rising gradient Sr, and the operation time Tp, it is possible to set appropriate threshold values suitable for a situation on the spot. Therefore, using these opening degree threshold value Pth and time threshold value Tth, it is possible to improve the accuracy of determination as to whether or not the driver is erroneously performing an accelerator operation instead of a brake operation.

Second Embodiment (Configuration)

In the present embodiment, it is made difficult to determine that the pedal depression is erroneously made when the driver has depressed the accelerator pedal twice. The device configuration is the same as that in the first embodiment described above.

Figure 19:
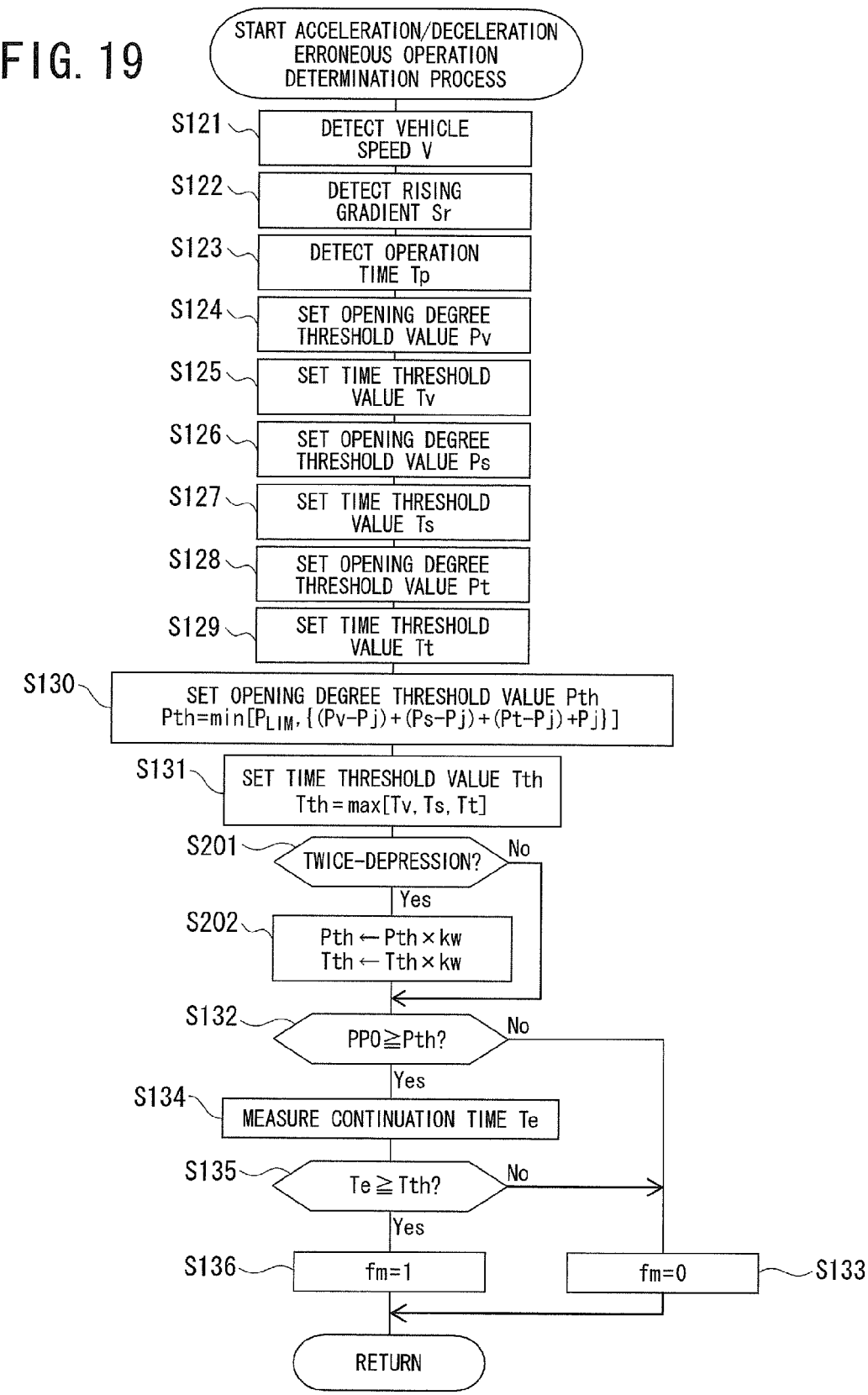
FIG. 19 is a flowchart illustrative of an acceleration/deceleration erroneous operation determination process in a second embodiment.

Next, an acceleration/deceleration erroneous operation determination process in the present embodiment will be described. FIG. 19 is a flowchart illustrative of the acceleration/deceleration erroneous operation determination process in the second embodiment.

Herein, processes of new steps S201 and S202 are added between steps S131 and S132 in the above-described first embodiment. Since the other processes are the same as those in the above-described first embodiment, a description of the common portions will be omitted.

At step S201, it is determined whether or not the driver has depressed the accelerator pedal twice. The twice-depression represents that, after the suppression function for erroneous operation acceleration is operated based on a determination that the pedal depression is erroneously made, the pedal opening degree PPO is reduced to a predetermined value P (for example, 20%) or less and further that the pedal opening degree PPO is again increased in a predetermined time T (for example, 2 sec) from that time point. This process is for detecting an accelerator operation such that when the suppression function for erroneous operation acceleration has operated against the intention of the driver, the driver again depresses the accelerator pedal as his/her own declaration of intention. Herein, when it is detected that the depression has been made by the driver twice, it is determined that the possibility of the pedal depression being caused erroneously made is low, and the process proceeds to step S202. On the other hand, when it is not detected that the depression has been made by the driver twice, the process directly proceeds to step S132 described earlier.

At step S202, the opening degree threshold value Pth and the time threshold value Tth are corrected by a predetermined correction gain kw as described below. Herein, the correction gain kw is a value greater than 1 (for example, about 1.2). The opening degree threshold value Pth and the time threshold value Tth are each multiplied by the correction gain kw so as to be increasingly corrected.

$Pth \leftarrow Pth \times kw$ $Tth \leftarrow Tth \times kw$

After increasingly correcting the opening degree threshold value Pth and the time threshold value Tth in accordance with the correction gain kw as described above, the process proceeds to step S132 described earlier. The foregoing is the acceleration/deceleration erroneous operation determination process in the second embodiment.

(Action)

Next, the action in the second embodiment will be described. When the depression of the pedal has been made twice after the suppression function for erroneous operation acceleration is operated, this is considered to be driver's declaration of intention to cancel the operation of the suppression function for erroneous operation acceleration. Therefore, when it is detected that the depression by the driver has been made twice after the suppression function for erroneous operation acceleration is operated ("Yes" at step S201), the opening degree threshold value Pth and the time threshold value Tth are both increasingly corrected (step S202).

That is, by setting the opening degree threshold value Pth and the time threshold value Tth greater when it is detected that the depression has been made twice than when it is not detected that the depression has been made twice, it is made difficult to determine that the depression is erroneously made. Therefore, it is possible to suppress an incorrect determination that a normal accelerator operation is determined to be the erroneous depression, and thus it is possible to improve the determination accuracy. In the present embodiment, the other portions common to the above-described first embodiment exhibit the same action and effect as those in the first embodiment and therefore a detailed description thereof will be omitted.

(Modification)

In the present embodiment, the opening degree threshold value Pth and the time threshold value Tth set in accordance with the vehicle speed V, the rising gradient Sr, and the operation time Tp are multiplied by the correction gain kw so as to be corrected. However, the present invention is not limited to this. For example, an opening degree threshold value Pw in the case where the depression has been made twice may be set and a final opening degree threshold value Pth may be set in accordance with the opening degree threshold values Pv, Ps, Pt, and Pw in the process at step S130. Likewise, a time threshold value Tw in the case where the depression has been made twice may be set and a final time threshold value Tth may be set in accordance with the time threshold values Tv, Ts, Tt, and Tw in the process at step S131. In a word, any technique may be used as long as it can make it difficult to determine that the pedal depression is erroneously made when it is detected that the depression has been made twice than when it is not detected that the depression has been made twice.

As described above, the process at step S201 corresponds to a "twice-operation detection unit" and the process at step S202 is included in a "threshold value setting unit" and a "threshold value setting unit".

(Effect)

Next, the effects of the main part in the second embodiment will be described.

(1) In the acceleration/deceleration erroneous operation determination device in the present embodiment, twice-depression is defined such that, after at least one of suppressing a vehicle driving force or generating a vehicle braking force is started, the driver reduces the pedal opening degree PPO to a predetermined value and again increases the pedal opening degree PPO in a predetermined time. Then, the opening degree threshold value Pth is set greater when the twice-depression is detected than when the twice-depression is not detected. In this manner, by setting the opening degree threshold value Pth greater when the twice-operation is detected than when the twice-operation is not detected, it is possible to suppress an incorrect determination that a normal accelerator operation is determined to be the erroneous depression, and thus it is possible to improve the determination accuracy.

(2) In the acceleration/deceleration erroneous operation determination device in the present embodiment, twice-depression is defined such that, after at least one of suppressing a vehicle driving force or generating a vehicle braking force is started, the driver reduces the pedal opening degree PPO to a predetermined value and again increases the pedal opening degree PPO in a predetermined time. Then, the time threshold value Tth is set greater when the twice-depression is detected than when the twice-depression is not detected. In this manner, by setting the time threshold value Tth greater when the twice-operation is detected than when the twice-operation is not detected, it is possible to suppress an incorrect determination that a normal accelerator operation is determined to be the erroneous depression, and thus it is possible to improve the determination accuracy.

Third Embodiment (Configuration)

In this embodiment, it is made difficult to determine that the pedal depression is erroneously made as a shift time Tc from a brake operation to an accelerator operation decreases. The device configuration is the same as that in the first embodiment described above.

Figure 20:
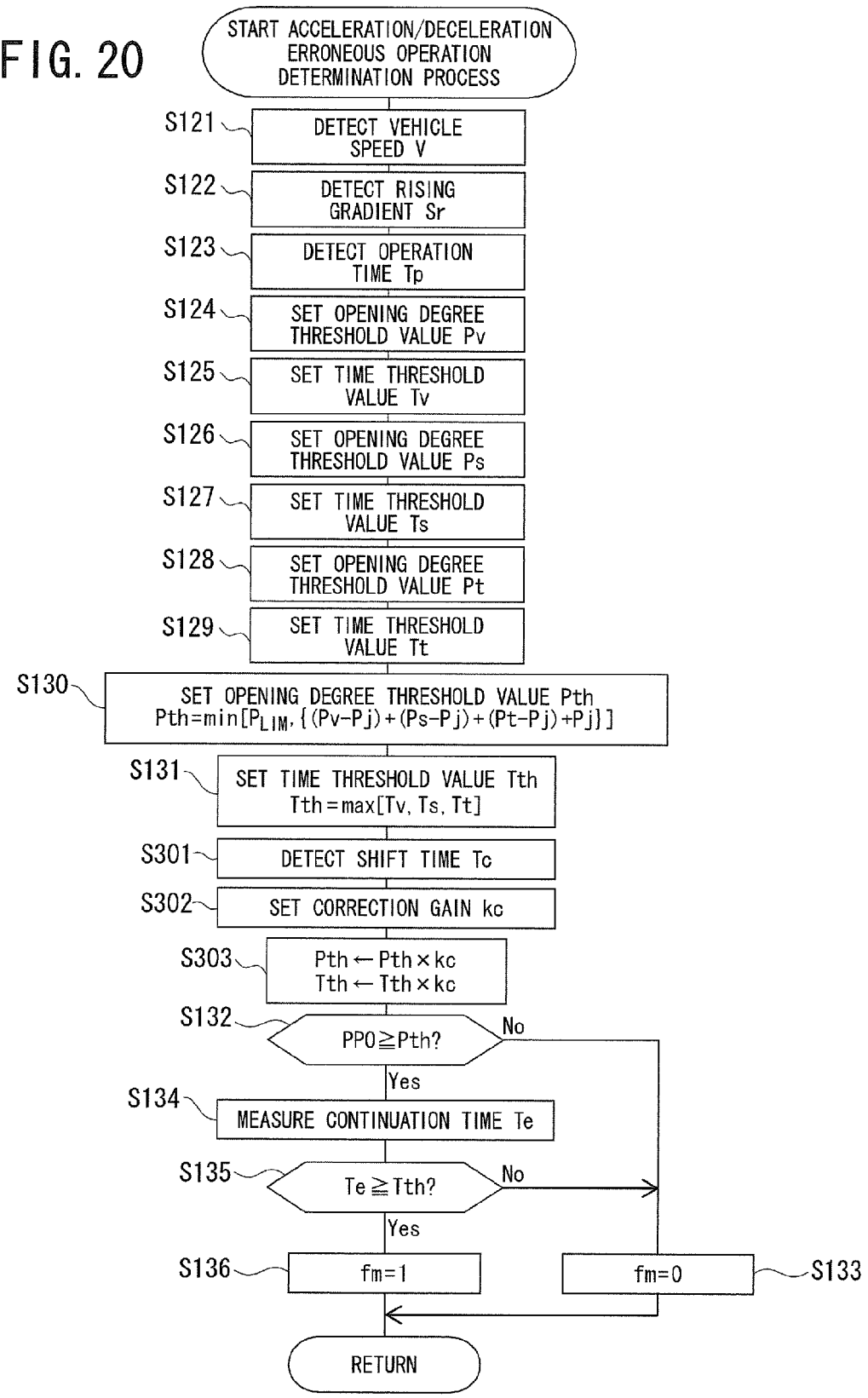
FIG. 20 is a flowchart illustrative of an acceleration/deceleration erroneous operation determination process in a third embodiment.

Next, an acceleration/deceleration erroneous operation determination process in the present embodiment will be described. FIG. 20 is a flowchart illustrative of the acceleration/deceleration erroneous operation determination process in the third embodiment.

Herein, processes of new steps S301 to S303 are added between steps S131 and S132 in the above-described first embodiment. Since the other processes are the same as those in the above-described first embodiment, a description of the common portions will be omitted.

At step S301, a shift time Tc from the stop of a brake operation to the start of an accelerator operation is detected. Specifically, a continuation time after braking becomes OFF until the pedal opening degree PPO becomes a predetermined value Pa (for example, 3%) or greater is measured by a timer and the timer measurement value is read in.

Subsequently, at step S302, by referring to a map of FIG. 21, a correction gain kc is set in accordance with the shift time Tc.

Figure 21:
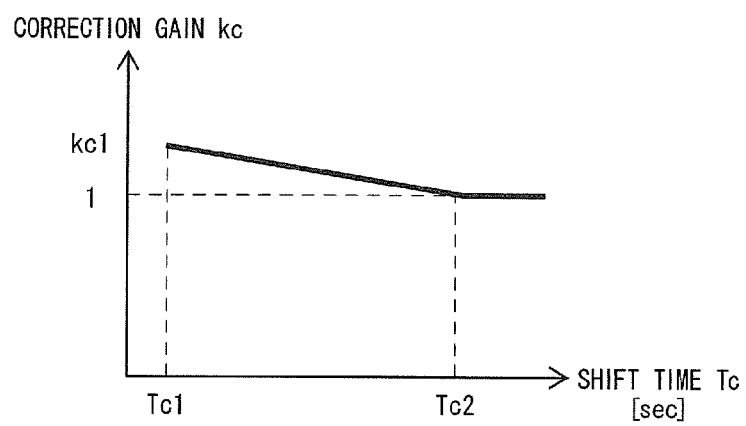
FIG. 21 is a map for use in setting a correction gain kc.

FIG. 21 is a map for use in setting a correction gain kc. In this map, for the shift time Tc, Tc1 (for example, about 0.3 sec) and Tc2 (for example, about 6 sec) satisfying a relationship of 0<Tc1<Tc2 are determined in advance, while, for the correction gain kc, kc1 (for example, about 1.2) satisfying a relationship of 1<kc1 is determined in advance. Tc1 corresponds to a fastest time required for a depression shift from the brake pedal to the accelerator pedal, while Tc2 corresponds to a time which makes it possible to determine that the depression is not directly shifted from the brake pedal to the accelerator pedal. When the shift time Tc is in a range from Tc1 to Tc2, the correction gain kc decreases in a range from kc1 to 1 as the shift time Tc increases. When the shift time Tc is greater than or equal to Tc2, the correction gain kc maintains 1.

Subsequently, at step S303, the opening degree threshold value Pth and the time threshold value Tth are corrected by the correction gain kc as described below. That is, the opening degree threshold value Pth and the time threshold value Tth are each multiplied by the correction gain kc so that the opening degree threshold value Pth and the time threshold value Tth are both corrected.

$$Pth \leftarrow Pth \times kc$$

$$Tth \leftarrow Tth \times kc$$

After correcting the opening degree threshold value Pth and the time threshold value Tth in accordance with the correction gain kc as described above, the process proceeds to step S132 described earlier. The foregoing is the acceleration/deceleration erroneous operation determination process in the third embodiment.

(Action)

Next, the action in the third embodiment will be described. It is considered that when the shift time Tc from a brake operation to an accelerator operation is short, the possibility of depressing the pedal erroneously made is also correspondingly low. Conversely, it is considered that when the driver does not promptly start an accelerator operation after stopping a brake operation and does something such as putting his/her foot on the floor, as the time elapses more, the possibility of depressing the accelerator pedal erroneously made instead of depressing the brake pedal again becomes higher.

Therefore, the shift time Tc from the stop of a brake operation to the start of an accelerator operation is detected (step S301), the correction gain kc is set in accordance with the shift time Tc (step S302), and the opening degree threshold value Pth and the time threshold value Tth are both corrected by the correction gain kc (step S303). In this event, the shorter the shift time Tc, the more the correction gain kc increases from 1, and accordingly, the opening degree threshold value Pth and the time threshold value Tth are both increasingly corrected.

That is, by setting the opening degree threshold value Pth and the time threshold value Tth greater as the shift time Tc decreases, it is made difficult to determine that the depression is erroneously made. Therefore, it is possible to suppress an incorrect determination that a normal accelerator operation is determined to be the erroneous depression, and thus it is possible to improve the determination accuracy.

In the present embodiment, the other portions common to the above-described first embodiment exhibit the same action and effect as those in the first embodiment and therefore a detailed description thereof will be omitted.

(Modification)

In the present embodiment, the opening degree threshold value Pth and the time threshold value Tth set in accordance with the vehicle speed V, the rising gradient Sr, and the operation time Tp are multiplied by the correction gain kc so as to be corrected. However, the present invention is not limited to this. For example, an opening degree threshold value Pc according to a shift time Tc may be set and a final opening degree threshold value Pth may be set in accordance with the opening degree threshold values Pv, Ps, Pt, and Pc in the process at step S130. Likewise, a time threshold value Tc according to a shift time Tc may be set and a final time threshold value Tth may be set in accordance with the time threshold values Tv, Ts, Tt, and Tc in the process at step S131. In a word, any technique may be used when it can make it difficult to determine that the pedal depression is erroneously made as the shift time Tc decreases.

From the above, the process at step S301 corresponds to a "shift time detection unit" and the processes at steps S302 and S303 are included in a "threshold value setting unit" and a "threshold value setting unit".

Effect

Next, the effects of the main part in the third embodiment will be described.

(1) The acceleration/deceleration erroneous operation determination device in the present embodiment is configured to detect a shift time Tc from stopping of a brake operation by the driver to starting of an accelerator operation by the driver, and sets an opening degree threshold value Pth greater as the shift time Tc decreases. In this manner, by setting the opening degree threshold value Pth greater as the shift time Tc decreases, it is possible to suppress an incorrect determination that a normal accelerator operation is determined to be the erroneous depression, and thus it is possible to improve the determination accuracy.

(2) The acceleration/deceleration erroneous operation determination device in the present embodiment is configured to detect a shift time Tc from stopping of a brake operation by the driver to starting of an accelerator operation by the driver, and sets a time threshold value Tth greater as the shift time Tc decreases. In this manner, by setting the time threshold value Tth greater as the shift time Tc decreases, it is possible to suppress an incorrect determination that a normal accelerator operation is determined to be the erroneous depression, and thus it is possible to improve the determination accuracy.

Fourth Embodiment (Configuration)

In this embodiment, it is made difficult to determine that the pedal depression is erroneously made as an operation speed dP of the accelerator pedal decreases. The device configuration is the same as that in the first embodiment described above.

Figure 22:
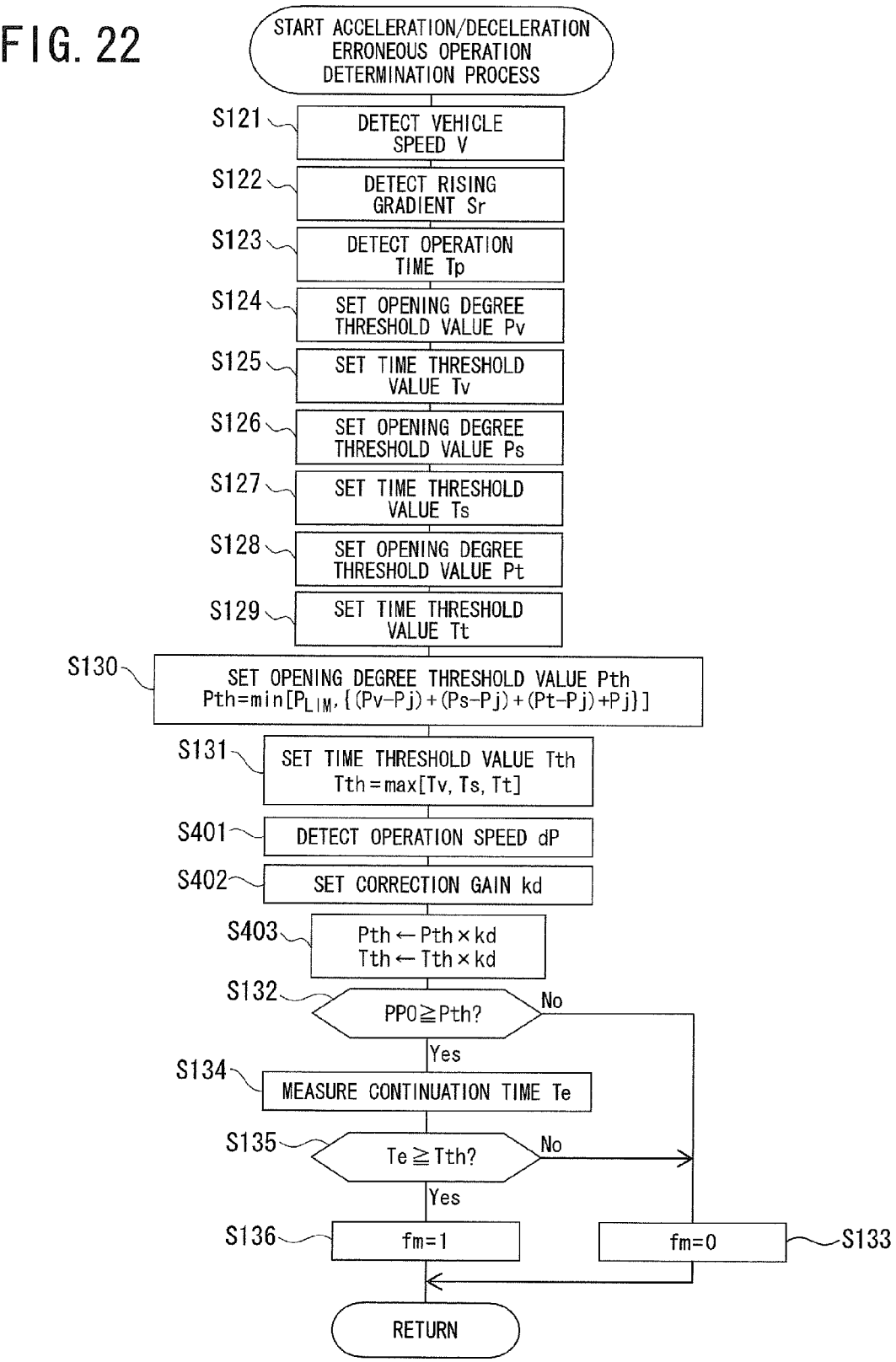
FIG. 22 is a flowchart illustrative of an acceleration/deceleration erroneous operation determination process in a fourth embodiment.

Next, an acceleration/deceleration erroneous operation determination process in this embodiment will be described. FIG. 22 is a flowchart illustrative of the acceleration/deceleration erroneous operation determination process in the fourth embodiment.

Herein, processes of new steps S401 to S403 are added between steps S131 and S132 in the above-described first embodiment. Since the other processes are the same as those in the above-described first embodiment, a description of the common portions will be omitted. At step S401, an operation speed dP of the accelerator pedal is detected. That is, an amount of change in the pedal opening degree PPO per unit time is detected as an operation speed dP.

Subsequently, at step S402, by referring to a map of FIG. 23, a correction gain kd is set in accordance with the operation speed dP.

Figure 23:
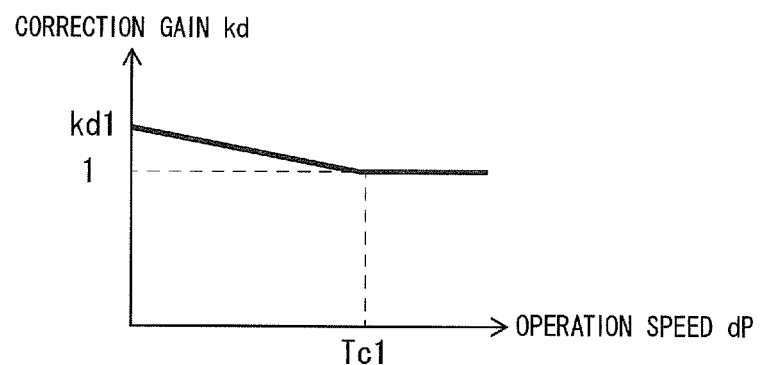
FIG. 23 is a map for use in setting a correction gain kd.

FIG. 23 is a map for use in setting a correction gain kd. In this map, for the operation speed dP, dP1 satisfying a relationship of 0<dP1 is determined in advance, while, for the correction gain kd, kd1 (for example, about 1.2) satisfying a relationship of 1<kd1 is determined in advance. When the operation speed dP is in a range from 0 to dP1, the correction gain kd decreases in a range from kd1 to 1 as the operation speed dP increases. When the operation speed dP is greater than or equal to dP1, the correction gain kd maintains 1.

Subsequently, at step S403, the opening degree threshold value Pth and the time threshold value Tth are corrected by the correction gain kd as described below. That is, the opening degree threshold value Pth and the time threshold value Tth are each multiplied by the correction gain kd so that the opening degree threshold value Pth and the time threshold value Tth are both corrected.

$$Pth \leftarrow Pth \times kd$$

$$Tth \leftarrow Tth \times kd$$

After correcting the opening degree threshold value Pth and the time threshold value Tth in accordance with the correction gain kd as described above, the process proceeds to step S132 described earlier. The foregoing is the acceleration/deceleration erroneous operation determination process in the fourth embodiment.

(Action)

Next, the action in the fourth embodiment will be described. It is generally known that the depression speed is faster when the accelerator pedal is erroneously depressed instead of the brake pedal. Further, it is considered that when the operation speed dP of the accelerator pedal is slow, the driver is trying to control the pedal opening degree PPO to that extent. Therefore, the operation speed dP of the accelerator pedal is detected (step S401), the correction gain kd is set in accordance with the operation speed dP (step S402), and the opening degree threshold value Pth and the time threshold value Tth are both corrected by the correction gain kd (step S403). In this event, the slower the operation speed dP, the more the correction gain kd increases from 1, and accordingly, the opening degree threshold value Pth and the time threshold value Tth are both increasingly corrected.

That is, by setting the opening degree threshold value Pth and the time threshold value Tth greater as the operation speed dP decreases, it is made difficult to determine that the depression is erroneously made. Therefore, it is possible to suppress an incorrect determination that a normal accelerator operation is determined to be the erroneous depression, and thus it is possible to improve the determination accuracy.

In the present embodiment, the other portions common to the above-described first embodiment exhibit the same action and effect as those in the first embodiment and therefore a detailed description thereof will be omitted.

(Modification)

In the present embodiment, the opening degree threshold value Pth and the time threshold value Tth set in accordance with the vehicle speed V, the rising gradient Sr, and the operation time Tp are multiplied by the correction gain kd so as to be corrected. However, the present invention is not limited to this. For example, an opening degree threshold value Pd according to an operation speed dP may be set and a final opening degree threshold value Pth may be set in accordance with the opening degree threshold values Pv, Ps, Pt, and Pd in the process at step S130. Likewise, a time threshold value Td according to an operation speed dP may be set and a final time threshold value Tth may be set in accordance with the time threshold values Tv, Ts, Tt, and Td in the process at step S131. In a word, any technique may be used when it can make it difficult to determine that the pedal depression is erroneously made as the operation speed dP decreases.

From the above, the process at step S401 corresponds to an "operation speed detection unit" and the processes at steps S402 and S403 are included in a "threshold value setting unit" and a "threshold value setting unit".

(Effect)

Next, the effects of the main part in the fourth embodiment will be described.

(1) The acceleration/deceleration erroneous operation determination device in the present embodiment is configured to detect an accelerator operation speed dP and sets an opening degree threshold value Pth greater as the operation speed dP decreases. In this manner, by setting the opening degree threshold value Pth greater as the operation speed dP decreases, it is possible to suppress an incorrect determination that a normal accelerator operation is determined to be the erroneous depression, and thus it is possible to improve the determination accuracy.

(2) The acceleration/deceleration erroneous operation determination device in the present embodiment is configured to detect an accelerator operation speed dP and sets a time threshold value Tth greater as the operation speed dP decreases. In this manner, by setting the time threshold value Tth greater as the operation speed dP decreases, it is possible to suppress an incorrect determination that a normal accelerator operation is determined to be the erroneous depression, and thus it is possible to improve the determination accuracy.

While the present invention has been described herein referring to a limited number of embodiments, the scope of rights is not limited to them. Modifications of the embodiments based on the above-described disclosure are apparent to those skilled in the art. Further, the respective embodiments may be used in any combination thereof.

The invention claimed is:

1. An acceleration/deceleration erroneous operation determination device, comprising:
   an operation amount detection unit configured to detect an accelerator operation amount operated by a driver;
   a continuation time detection unit configured to detect a continuation time when the accelerator operation amount is greater than an operation amount threshold value;
   an erroneous operation determination unit configured to determine that the driver is erroneously performing an accelerator operation instead of a brake operation when the continuation time exceeds a threshold value;
   a vehicle speed detection unit configured to detect a vehicle speed of a vehicle;
   a gradient detection unit configured to detect a rising gradient of a road surface;
   an operation time detection unit configured to detect an accelerator operation time by the driver, wherein the accelerator operation time is a time after the accelerator operation amount exceeds a pedal opening degree threshold value;
   a threshold value setting unit configured to make variable at least one of the operation amount threshold value or the time threshold value, the operation amount threshold value and the time threshold value are made variable in accordance with all of the vehicle speed, the rising gradient, and the accelerator operation time; and
   a drive source or a brake, wherein, when it is determined that the driver is erroneously performing the accelerator operation instead of the brake operation, the drive source is operable to suppress a vehicle driving force and the brake is operable to generate a vehicle braking force.

2. The acceleration/deceleration erroneous operation determination device according to claim 1, further comprising:
   a first operation amount threshold value setting unit configured to set a first operation amount threshold value for the accelerator operation amount in accordance with the vehicle speed;
   a second operation amount threshold value setting unit configured to set a second operation amount threshold value for the accelerator operation amount in accordance with the rising gradient; and
   a third operation amount threshold value setting unit configured to set a third operation amount threshold value for the accelerator operation amount in accordance with the accelerator operation time,
   wherein the threshold value setting unit is configured to set the operation amount threshold value for the accelerator operation amount in accordance with the first operation amount threshold value set by the first operation amount threshold value setting unit, the second operation amount threshold value set by the second operation amount threshold value setting unit, and the third operation amount threshold value set by the third operation amount threshold value setting unit.

3. The acceleration/deceleration erroneous operation determination device according to claim 1, further comprising:
   a first time threshold value setting unit configured to set a first time threshold value for the continuation time in accordance with the vehicle speed;
   a second time threshold value setting unit configured to set a second time threshold value for the continuation time in accordance with the rising gradient; and a third time threshold value setting unit configured to set a third time threshold value for the continuation time in accordance with the accelerator operation time, wherein the threshold value setting unit is configured to set, as the time threshold value for the continuation time, any one of a longest time of the first time threshold value set by the first time threshold value setting unit, the second time threshold value set by the second time threshold value setting unit, and the third time threshold value set by the third time threshold value setting unit.

4. The acceleration/deceleration erroneous operation determination device according to claim 1, wherein the threshold value setting unit is configured to set the operation amount threshold value greater, as the vehicle speed is lower.

5. The acceleration/deceleration erroneous operation determination device according to claim 1, wherein the threshold value setting unit is configured to set the operation amount threshold value greater, as the rising gradient is larger.

6. The acceleration/deceleration erroneous operation determination device according to claim 1, wherein the threshold value setting unit is configured to set the operation amount threshold value greater, as the accelerator operation time is longer.

7. The acceleration/deceleration erroneous operation determination device according to claim 1, wherein the threshold value setting unit is configured to set the time threshold value greater, as the vehicle speed is lower.

8. The acceleration/deceleration erroneous operation determination device according to claim 1, wherein the threshold value setting unit is configured to set the time threshold value greater, as the rising gradient is larger.

9. The acceleration/deceleration erroneous operation determination device according to claim 1, wherein the threshold value setting unit is configured to set the time threshold value greater, as the accelerator operation time is longer.

10. The acceleration/deceleration erroneous operation determination device according to claim 1, further comprising:
a twice-operation detection unit configured to detect a twice-operation, the twice-operation being defined such that, after the drive source or the brake starts at least one of suppressing the vehicle driving force and generating the vehicle braking force, the driver reduces the accelerator operation amount to a predetermined value and again increases the accelerator operation amount in a predetermined time,
wherein the threshold value setting unit is configured to set the operation amount threshold value to be greater when the twice-operation is than when the twice-operation is not detected by the twice-operation detection unit.

11. The acceleration/deceleration erroneous operation determination device according to claim 1, further comprising:
a twice-operation detection unit configured to detect a twice-operation, the twice-operation being defined such that, after the drive source or the brake starts at least one of suppressing the vehicle driving force and generating the vehicle braking force, the driver reduces the accelerator operation amount to a predetermined value and again increases the accelerator operation amount in a predetermined time,
wherein the threshold value setting unit is configured to set the time threshold value to be greater when the twice-operation is detected by the twice-operation detection unit than when the twice-operation is not detected by the twice-operation detection unit.

12. The acceleration/deceleration erroneous operation determination device according to claim 1, further comprising:
a shift time detection unit configured to detect a shift time from a time when the driver stops the brake operation to a time when the driver starts the accelerator operation,
wherein the threshold value setting unit is configured to set the operation amount threshold value greater, as the shift time is shorter.

13. The acceleration/deceleration erroneous operation determination device according to claim 1, further comprising:
a shift time detection unit configured to detect a shift time from a time when the driver stops the brake operation to a time when the driver starts the accelerator operation,
wherein the threshold value setting unit is configured to set the time threshold value to be greater, as the shift time is shorter.

14. The acceleration/deceleration erroneous operation determination device according to claim 1, further comprising:
an operation speed detection unit configured to detect an accelerator operation speed operated by the driver,
wherein the threshold value setting unit is configured to set the operation amount threshold value to be greater, as the accelerator operation speed is lower.

15. The acceleration/deceleration erroneous operation determination device according to claim 1, further comprising:
an operation speed detection unit configured to detect an accelerator operation speed operated by the driver,
wherein the threshold value setting unit is configured to set the time threshold value to be greater, as the accelerator operation speed is lower.

16. An acceleration/deceleration erroneous operation determination method of detecting a continuation time for which an accelerator operation amount operated by a driver is greater than an operation amount threshold value, and determining that the driver is erroneously performing an accelerator operation instead of a brake operation when the continuation time exceeds a time threshold value, the method comprising:
detecting a vehicle speed of a vehicle, a rising gradient of a road surface, and an accelerator operation time operated by the driver;
making variable at least one of the operation amount threshold value or the time threshold value, the operation amount threshold value and the time threshold value are both made variable in accordance with all of the vehicle speed, the rising gradient, and the accelerator operation time; and
suppressing a vehicle driving force or generating a vehicle braking force when it is determined that the driver is erroneously performing the accelerator operation instead of the brake operation.

* * * * *